United States Patent [19]

Yoneda et al.

[11] Patent Number: 5,519,877
[45] Date of Patent: May 21, 1996

[54] APPARATUS FOR SYNCHRONIZING PARALLEL PROCESSING AMONG A PLURALITY OF PROCESSORS

[75] Inventors: Yasushi Yoneda, Ikeda; Shinichi Saeki, Sakai; Noriyuki Hidaka, Moriguchi; Minobu Abe, Hirakata, all of Japan

[73] Assignee: Matsushita Electric Industrial Co., Ltd., Osaka, Japan

[21] Appl. No.: 180,894

[22] Filed: Jan. 12, 1994

[30] Foreign Application Priority Data

Jan. 12, 1993 [JP] Japan ................................. 5-003123
Jan. 12, 1993 [JP] Japan ................................. 5-003124

[51] Int. Cl.$^6$ ............................... G06F 7/02; G06F 7/68; G06F 9/302; G06F 9/305
[52] U.S. Cl. .................. 395/800; 364/229.3; 364/229.5; 364/230.6; 364/231.4; 364/234.1; 364/239; 364/238.7; 364/241.6; 364/259.1; 364/259.2; 364/259.6; 364/270.4; 364/271.5; 364/271; 364/271.9; 364/DIG. 1; 364/DIG. 2; 395/550
[58] Field of Search ..................... 395/200, 550, 395/800, 325, 575, 775, 500, 250, 275, 650, 375, 468, 311, 350; 364/DIG. 1, DIG. 2; 371/68.1, 68.2, 68.3, 36, 71; 340/825.8, 825.87, 825.5, 825.51; 370/16.1, 85.6, 58.1, 94.2

[56] References Cited

U.S. PATENT DOCUMENTS

| | | | |
|---|---|---|---|
| 3,737,858 | 6/1973 | Turner et al. | 340/870.03 |
| 4,028,667 | 6/1977 | Breslau et al. | 395/325 |
| 4,228,495 | 10/1980 | Bernhard et al. | 364/136 |
| 4,412,303 | 10/1983 | Barnese et al. | 395/800 |
| 4,509,013 | 4/1985 | Sasao | 324/161 |
| 4,561,017 | 12/1985 | Greene | 348/707 |
| 4,748,588 | 12/1985 | Norman et al. | 395/550 |
| 4,789,789 | 2/1986 | Kersenbrock et al. | 340/825.06 |
| 4,799,001 | 1/1981 | Mori | 371/22.3 |
| 4,811,367 | 10/1987 | Tajika et al. | 370/105 |
| 4,969,089 | 11/1987 | Jakel et al. | 395/200 |
| 4,975,834 | 9/1989 | Xu et al. | 395/800 |
| 5,056,000 | 11/1989 | Chang | 375/325 |
| 5,121,390 | 3/1990 | Farrell et al. | 370/94 |
| 5,123,089 | 6/1992 | Beilinski et al. | 395/200 |
| 5,163,149 | 11/1992 | Brantely, Jr. et al. | 395/650 |
| 5,271,033 | 12/1993 | Norman | 371/68.1 |
| 5,365,228 | 11/1994 | Ghilds et al. | 340/825.8 |

Primary Examiner—Daniel Pan
Attorney, Agent, or Firm—Price, Gess & Ubell

[57] ABSTRACT

Disclosed is an apparatus of synchronizing parallel processing among a plurality of processors including a plurality of synchronization units respectively corresponding to the plurality of processors and a control unit. The control unit and the synchronization units are connected in a loop. Each synchronization unit outputs a sync signal for informing that the synchronization unit has entered a wait state to an adjacent downstream unit. The control unit outputs a pulse for informing a completion of a synchronization among the processors to an uppermost-stream synchronization unit. The pulse is forwarded as far as an lowermost-stream synchronization unit. Each synchronization unit includes the following: a flag hold unit holding a flag indicating a state of a respective processor, a logical OR circuit ORing a sync signal sent from an adjacent upstream synchronization unit with a value of the flag and outputting an obtained value to an adjacent downstream synchronization unit as a sync signal, a detection unit detecting the pulse in a value outputted from the logical OR circuit, thereby initiating the flag hold unit, and an output unit outputting the value outputted from the logical OR circuit to a respective processor.

43 Claims, 19 Drawing Sheets

APPARATUS FOR SYNCHRONIZING PARALLEL PROCESSING AMONG A PLURALITY OF PROCESSORS

BACKGROUND OF THE INVENTION (1) Field of the Invention

This invention relates to an apparatus for synchronizing parallel processing among a plurality of processors.

(2) Description of the Related Art

Parallel processing has been developed to speed up the performance of a plurality of processors. A general method which has been applied to various fields in order to achieve the parallel processing is to make several processors collaborate to proceed their processing in synchronization.

For example, in the field of image processing, each processor is assigned part of a frame constituting an image and is supposed to complete the processing for the assigned part within a display time corresponding to one frame. Hence, parallel processing among all the processors must be synchronized to perform the processing per frame.

Generally, barrier synchronization or event synchronization is used as a method for such synchronization.

According to the barrier synchronization, every processor, which has completed its processing, enters the wait state. When the number of waiting processors reaches a certain number, all the waiting processors restart their processing all at once.

According to the event synchronization, on the other hand, among all the processors, one is selected as an event-generation processor. When the event-generation processor informs the remaining processors of the generation of an event, these processors restart their processing all at once.

FIG. 1 shows a conventional barrier synchronization apparatus. Synchronizing parallel processing among a plurality of processors (or programs) is controlled by software (hereinafter referred to as sync software).

The barrier control block 100 and the queue 110, which are actually installed in a memory or a register of the apparatus, represent data controlled by the sync software and the processors (or programs).

The barrier control block 100 monitors the number of the processors and a pointer indicating the top of the queue 110.

The queue 110 consists of processor information 101–103 each representing a processor placed in the wait state. Each of the processor information 101–103 has the identification of a respective processor and a pointer indicating adjacent processor information.

The following is a series of operations to be performed by the conventional barrier synchronization apparatus shown in FIG. 1.

First of all; the sync software informs the barrier control block 100 of the number of processors whose processing are to be synchronized while clearing both waiting processors from the queue 110 and the pointer indicating the top of the queue 110. At this moment, all the processors are released from the wait state.

Every processor that has completed its processing refers to the number (q) of processor information pieces in the queue 110 and the number (n) of processors in operation. If the number q is less than n-1, the queue 110 is still available to one or more processors to produce their own processor information therein. When the number q is n-1, the queue 110 is full and the last processor is supposed to inform the sync software the completion of a synchronization.

Being informed of the completion, the sync software executes the above-mentioned initializing operation, and allows all the processors to restart their processing. Thus, synchronous parallel processing among a plurality of processors is repeated.

The above-mentioned construction and method for software-controlled barrier synchronization can be applied to software-controlled event synchronization as well.

FIG. 2 shows the construction of another conventional barrier synchronization apparatus having a logical OR unit 152, a control unit (not shown) as sync software, and a plurality of processor nodes 154 each composed of a processor unit 153 and a sync circuit 151. Each sync circuit 151 is set to "one" as the initial value, and the value "one" is changed to "zero" when the respective processor unit 153 enters the wait state.

The logical OR unit 152 ORs the outputs of all the sync circuits 151 and sends the value to all the processor units 153.

The following is a series of operations to be performed by the above-mentioned barrier synchronization apparatus.

(1) Each processor unit 153 writes a "one" as the initial value to the respective sync circuit 151.

(2) The control unit checks whether all the synchronization circuits 151 have been set to "ones". If they have, the control unit informs all the processor units 153 of the completion of an initialization. Each processor unit 153 restarts its processing.

(3) Every processor unit 153 that has entered the wait state writes a "zero" to the respective sync circuit 151, and waits for the logical OR unit 152 to output a "zero".

(4) If the logical OR unit 152 outputs a "zero", this means that parallel processing among all the processor units 153 are synchronized, so that each processor unit 153 restarts its processing.

Thus, the operations (1) and (2) for initialization are controlled by the control unit while the operations (3) and (4) for synchronization are carried out by each processor unit 153. These operations (1) through (4) are repeated for every synchronization.

However, the first-mentioned barrier synchronization apparatus has a defect that software provided to each processor unit requires a long time to check the number of waiting processor units and to produce the processor information for these processor units.

On the other hand, according to the second-mentioned barrier synchronization apparatus, the provision of the logical OR unit 152 has freed each processor node from checking the number of waiting processor nodes. However, the apparatus still demands some time for the initializing operations (1) and (2), which are controlled by software.

SUMMARY OF THE INVENTION

A first object of this invention is to provide an apparatus for quickly synchronizing parallel processing among a plurality of processors.

A second object of this invention is to provide the above-mentioned apparatus with simpler construction.

A third object of this invention is to provide an apparatus for synchronizing the processing among any desired number of processors out of the plurality of processors.

A fourth object of this invention is to provide an apparatus for synchronizing parallel processing among a plurality of processors, each of the processors being able to continue processing while it is waiting for the completion of a synchronization.

The first object can be achieved by a first apparatus for synchronizing parallel processing among a plurality of processors comprising a control unit and a plurality of synchronization units corresponding to the plurality of processors, respectively. The control unit and the synchronization units are connected in a loop. Each synchronization unit outputs a synchronization signal for informing that the synchronization unit has entered a wait state to a respective adjacent downstream unit. The control unit outputs a pulse for informing a completion of synchronization among the processors to an uppermost-stream synchronization unit, the pulse being forwarded as far as lowermost-stream synchronization unit. Each synchronization units comprises the following: a flag hold unit for holding a flag indicating a state of a respective processor; a logical OR circuit for ORing a synchronization signal sent from an adjacent upstream synchronization unit with a value of the flag and for outputting an obtained value to an adjacent downstream synchronization unit as a synchronization signal; a detection unit for detecting the pulse in a value outputted from the logical OR circuit, thereby initiating the flag hold unit; and an output unit for outputting the value outputted from the logical OR circuit to a respective processor.

The flag may have a value of either a logical one or a logical zero indicating that a respective processor is in operation and in a wait state respectively. The control unit may detect a change from the logical one to the logical zero, thereby outputting the pulse, which may be a logical one pulse with a fixed width.

The logical one and logical zero may indicate an occurrence of an event in event synchronization and no event occurrence respectively, so that the control unit may detect a change from the logical zero to the logical one, thereby outputting the logical one pulse.

The control unit may comprise the following: an inverter for receiving a synchronization signal from the lowermost stream synchronization unit and for outputting a logically reversed value; a switch for selecting between a signal inputted to the inverter and a signal outputted from the inverter, thereby outputting a selected signal; and a negative edge-triggered single shot circuit for outputting the logical one pulse when a negative edge is detected in the selected signal. The switch may select the signal inputted to the inverter for a barrier synchronization and selects the signal outputted from the inverter for an event synchronization.

According to the above-mentioned construction, the logical OR outputted from each logical OR unit is quickly transmitted as far as the control unit by means of the synchronization signals, and the pulse outputted from the control unit is quickly transmitted to all the synchronization units. This means that a time required for all the processors to restart their processing in synchronization after the completion of their previous processing is reduced. Hence, high speed barrier synchronization and high speed event synchronization can be achieved.

The first object can be achieved also by a second apparatus for synchronizing parallel processing among a plurality of processors, comprising the following: a plurality of processor nodes corresponding to the plurality of processors, respectively, each processor node outputting a signal indicating a state of a respective processor; a state detection unit for detecting a change in a level of an input signal and outputting a synchronization signal for indicating a completion of a synchronization and for initializing the processor nodes; and a logical OR circuit for logical ORing outputs of all the processor nodes and outputting a logical OR to the state detection unit as an input signal.

The second object can be achieved when at least one of the synchronization units of the first apparatus is a parallel synchronization unit comprising the following: a plurality of synchronization flag hold units corresponding to the plurality of processors, respectively, each synchronization flag hold unit holding a synchronization flag indicating a state of a respective processor; a wired OR circuit for wire-ORing outputs of all the synchronization flag hold units; a logical OR circuit for ORing a synchronization signal sent from an adjacent upstream synchronization unit with an output of the wired OR circuit and for outputting an obtained value to an adjacent downstream synchronization unit; and a plurality of synchronization detection units corresponding to the plurality of synchronization flag hold units respectively. The synchronization detection units detect the pulse in a value outputted from the logical OR circuit, thereby initializing a respective synchronization flag hold unit.

According to the above-mentioned construction, the single wired OR line connects the logical OR unit with all the processor nodes, thereby achieving the apparatus with the simpler construction.

The third object can be achieved when each processor node of the second apparatus further comprises an initialization prohibition unit for prohibiting initialization of the flag hold unit, the initialization being performed by the logical one pulse.

The flag hold unit may comprise a D flip-flop for holding the flag written by a respective processor, and the output unit may comprise a tri-state buffer for receiving a value of the flag held by the D flip-flop and for outputting a value obtained under a control of a read signal sent from a respective processor.

According to the above-mentioned construction, any desired processor nodes can be eliminated from the subject of synchronization.

The fourth object can be achieved when the output unit of each of the apparatuses to achieve the first, second, and third objects comprises an interrupt generation circuit for detecting the positive edge in the logical OR and for outputting a signal for requesting an interrupt to a respective processors.

According to the above-mentioned construction, the interrupt generation circuit informs all the processors of the completion of a synchronization, so that each processor can perform another operation while waiting for a synchronization.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

<EMBODIMENT 1>

Figure 1:
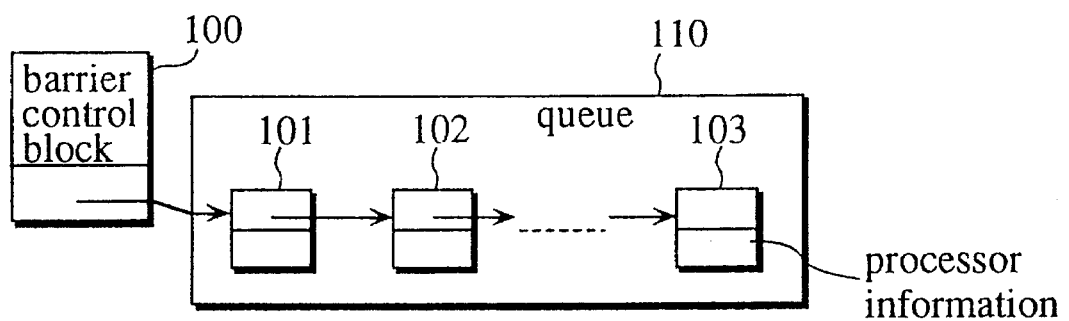
FIG. 1 is an illustration showing the construction of a conventional barrier synchronization apparatus, in which parallel processing among a plurality of processors (or programs) is controlled by sync software.
Figure 2:
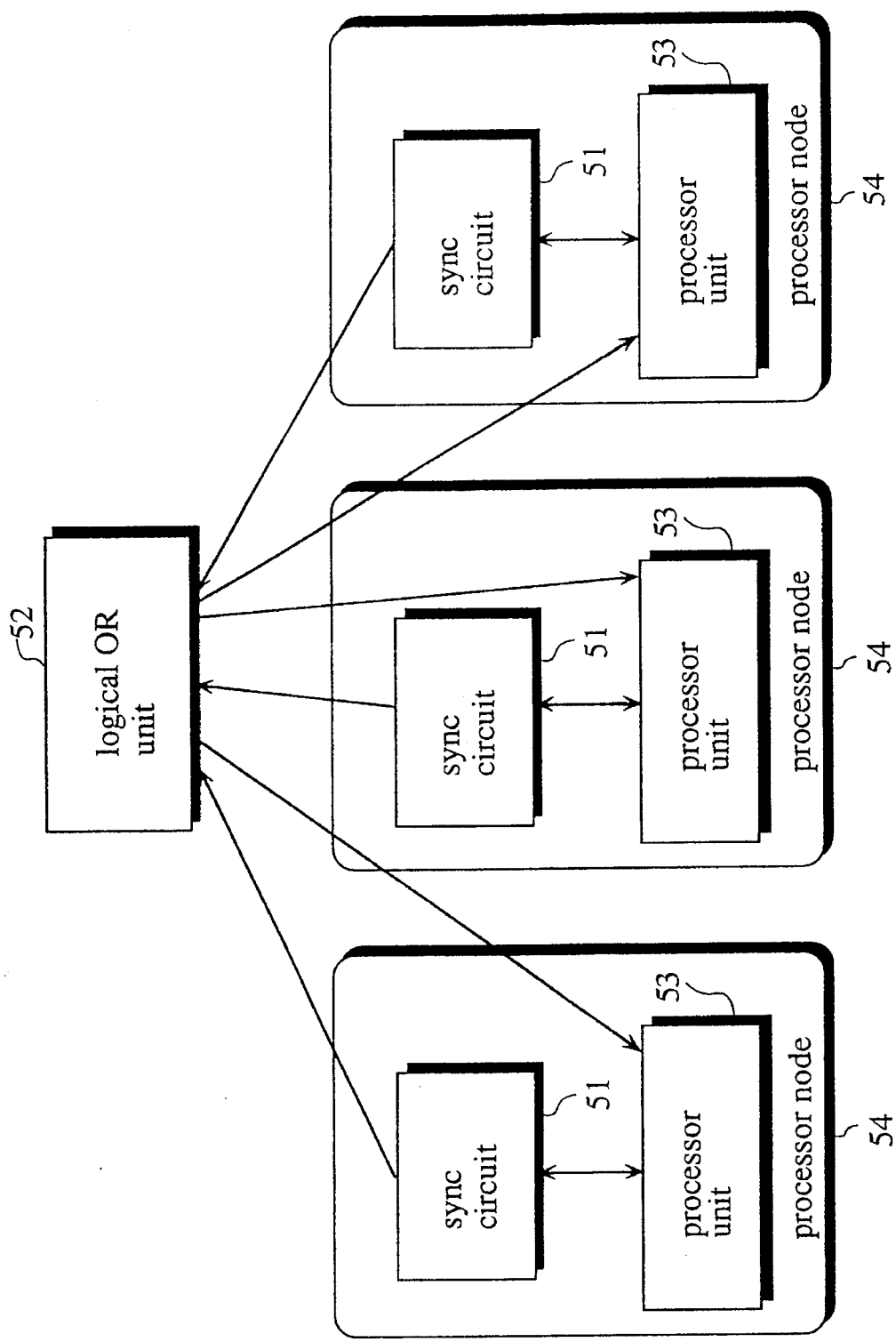
FIG. 2 is a block diagram showing the construction of another conventional barrier synchronization apparatus.
Figure 3:
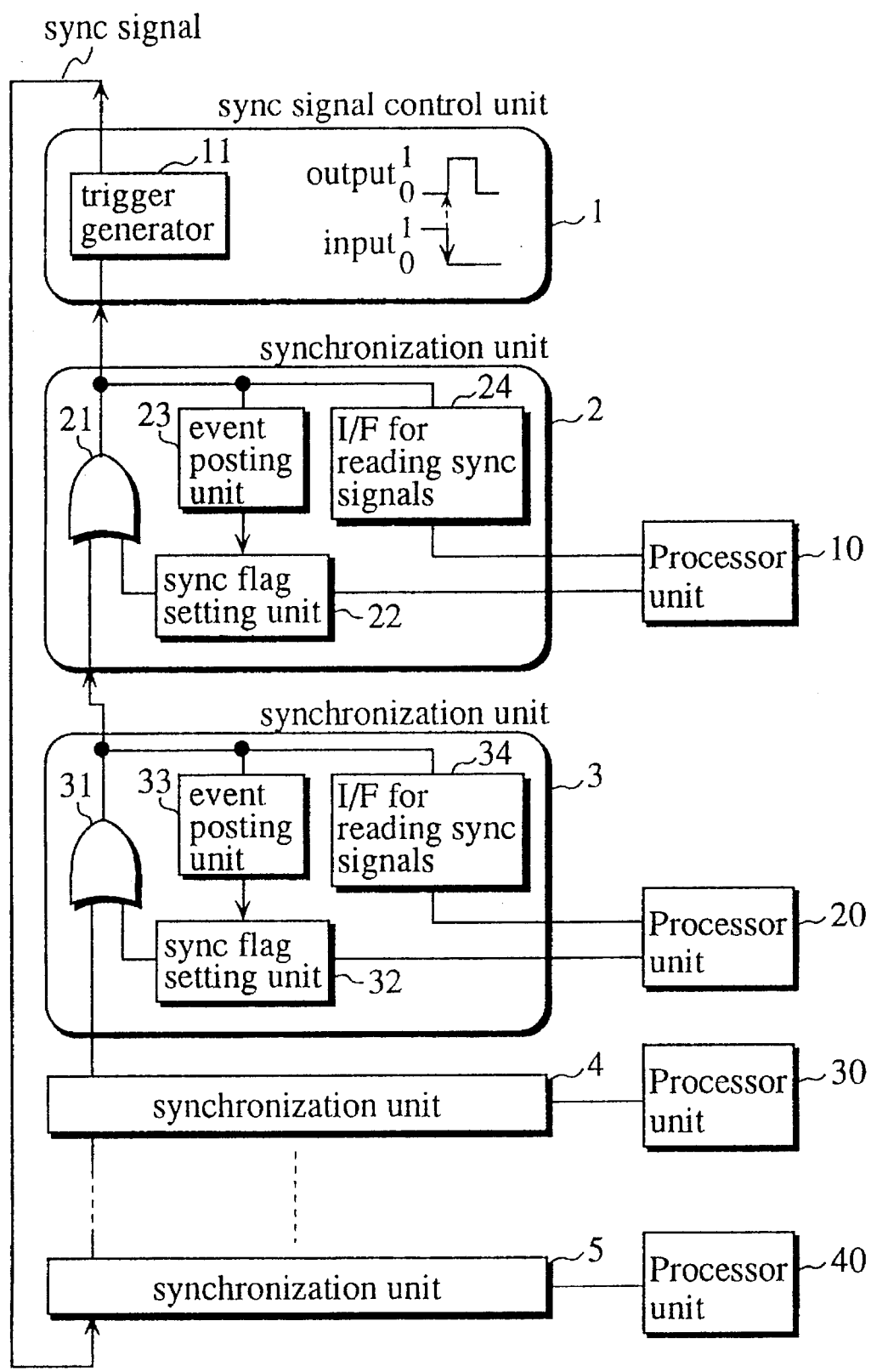
FIG. 3 is a block diagram showing the construction of the barrier synchronization apparatus according to Embodiment 1 of this invention.

FIG. 3 shows the construction of the apparatus of this embodiment for barrier synchronizing parallel processing among the processor units 10–40. The apparatus has a sync signal control unit 1 and synchronization units 2–5 connected to the processor units 10–40 respectively.

The sync signal control unit 1 and the synchronization unit 2–5 are connected in a loop via signals each traveling from a unit to an adjacent unit. These signals are referred to as the sync signals.

As the sync signal, the sync signal control unit 1 outputs a logical "one" pulse with a fixed width for informing the completion of a barrier synchronization. The synchronization units 2–5 output "ones" indicating that all the synchronization units in the upper stream are in operation and "zeros" indicating that they are in the wait state.

The sync signal control unit 1 is provided with a trigger generator 11 for detecting that all the synchronization units 1–5 have entered the wait state, i.e., the completion of a synchronization and for outputting the logical "one" pulse. More specifically, when the sync signal sent from the synchronization unit 2 changes its value from "one" to "zero", the trigger generator 11 outputs the logical "one" pulse.

The synchronization unit 2 is provided with an OR circuit 21, a sync flag setting unit 22, an event posting unit 23, and an I/F 24 for reading the sync signal. The synchronization unit 2 outputs a "one" through the OR circuit 21 when the processor unit 10 is in operation, and outputs a "zero" when the processor unit 10 has finished its processing.

The OR circuit 21 ORs the sync signal sent from the synchronization unit 3 in the upper stream with a signal outputted from the sync flag setting unit 22, and outputs the value to the sync signal control unit 1 in the down stream.

The sync flag setting unit 22, which holds a flag indicating the states of the processor unit 10, is set to "one" as the initial value and "zero" when the processor unit 10 has completed its processing.

The event posting unit 23, when it detects the rising edge of an output of the OR circuit 21, sets "one" to the sync flag setting unit 22. The rising edge is detected when the sync signal control unit 1 outputs the logical "one" pulse.

The I/F 24 forwards an output of the OR circuit 21 to the processor unit 10 in response to a direction of the processor unit 10.

The other synchronization units 3, 4, and 5 have the same construction as the synchronization unit 2.

Figure 4:
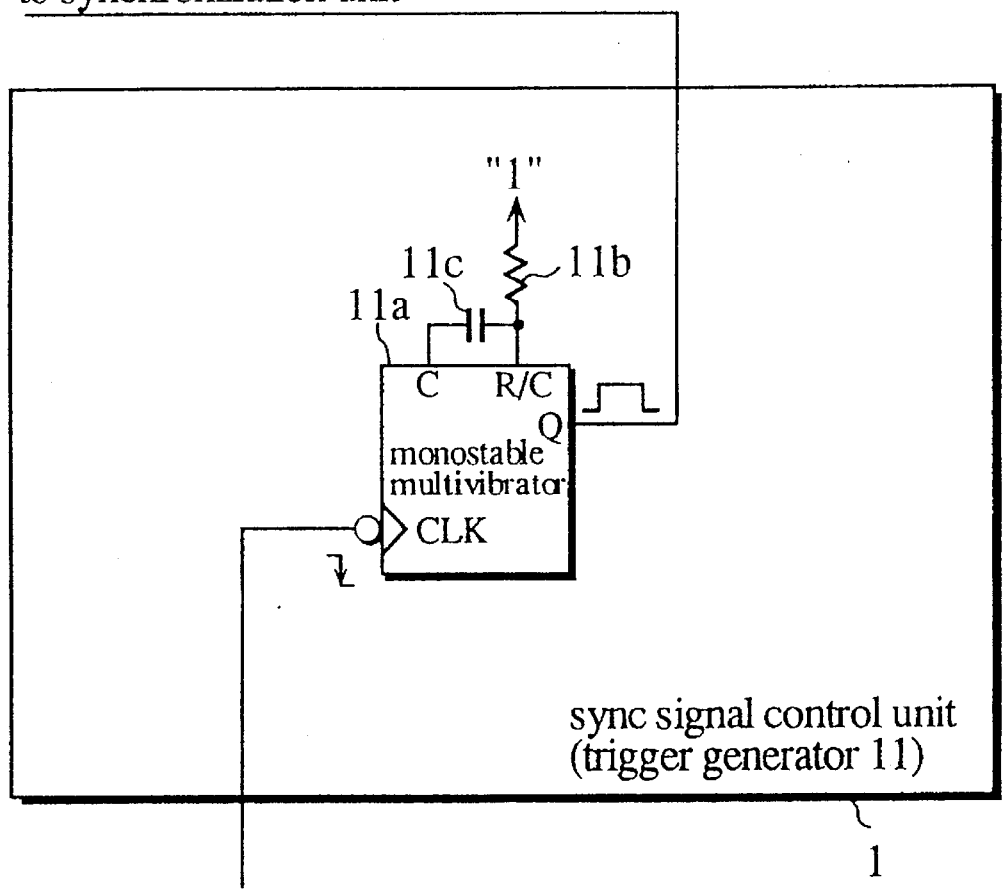
FIG. 4 is a specific circuit of the sync signal control unit 1 of the apparatus according to Embodiment 1.

FIG. 4 shows a specific circuit of the sync signal control unit 1, which corresponds to the trigger generator 11 in this embodiment. The sync signal control unit 1 is composed of a monostable multivibrator (hereinafter referred to as single shot) 11a, a resistance 11b, and a capacitor 11c.

The single shot 11a outputs a logical "one" pulse with the fixed width, responding to the reception of the falling edge of a sync signal from the synchronization unit 2. The width is determined through a time constant circuit consisting of the single shot 11a, the resistance 11b, and the capacitor 11c.

Figure 5:
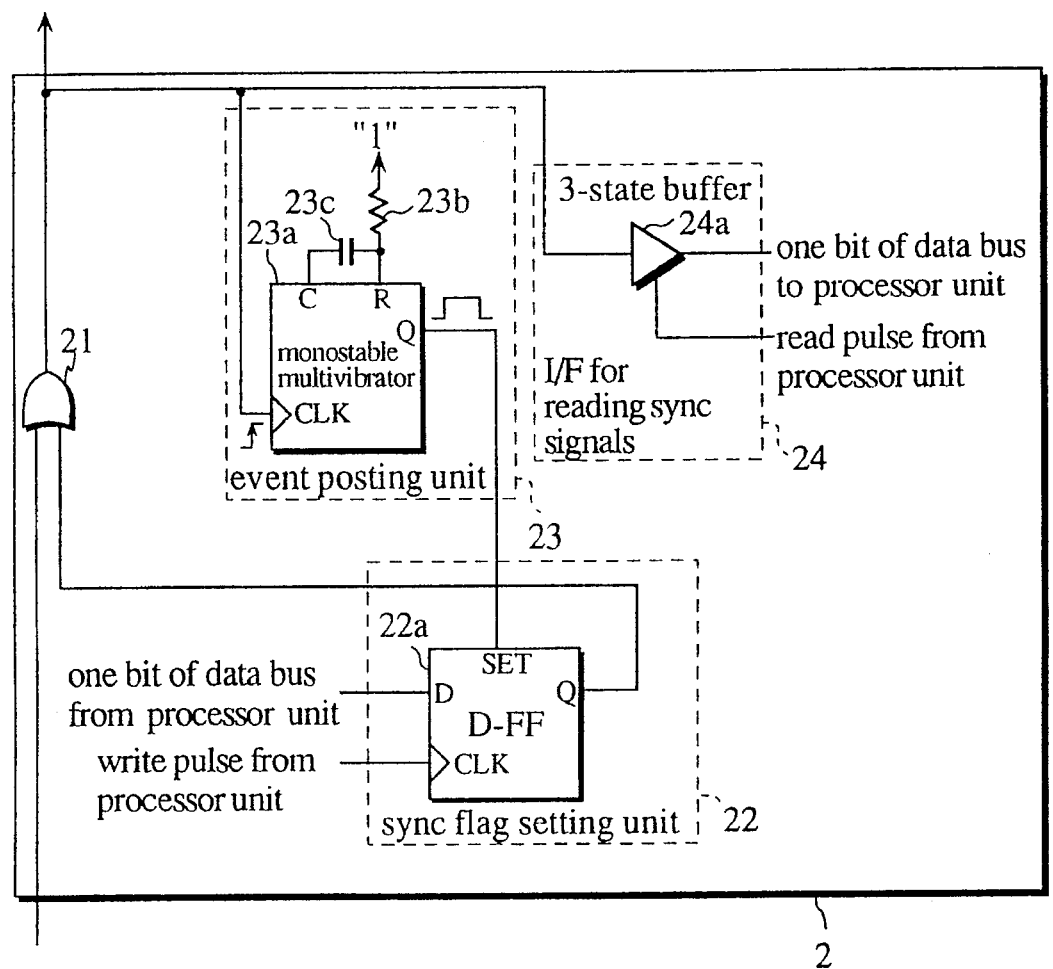
FIG. 5 a specific circuit of the synchronization unit 2 of the apparatus according to Embodiment 1.

FIG. 5 shows a specific circuit constituting the synchronization unit 2. The sync flag setting unit 22 consists of an D flip-flop (hereinafter referred to as D-FF) 22a. The event posting unit 23 is composed of the single shot 23a, the resistance 23b, and the capacitor 23c. The I/F 24 consists of a 3-state buffer 24a.

The clock terminal(CLK) of the D-FF 22a receives a write pulse from the processor unit 10.

In response to the flag, the D input terminal of the D-FF 22a receives a flag through a predetermined one bit of data bus sent from the processor unit 10.

The Q output terminal of the D-FF 22a outputs the value of the flag to an input terminal of the OR circuit 21. The SET of the D-FF 22a is set "one" by the "one" outputted from the Q output terminal of the single shot 23a.

In response to the input of the rising edge of sync signal from the OR circuit 21, the single shot 23a outputs a logical "one" pulse with a fixed width. The width is determined by a time constant circuit composed of the resistance 23b and the capacitor 23c.

When the control terminal (C) of the I/F 24 receives a sync signal from the processor unit 10, the 3-state buffer 24a outputs a sync signal sent from the OR circuit 21 to a predetermined bit position in the data bus of the processor unit 10.

Figure 6:
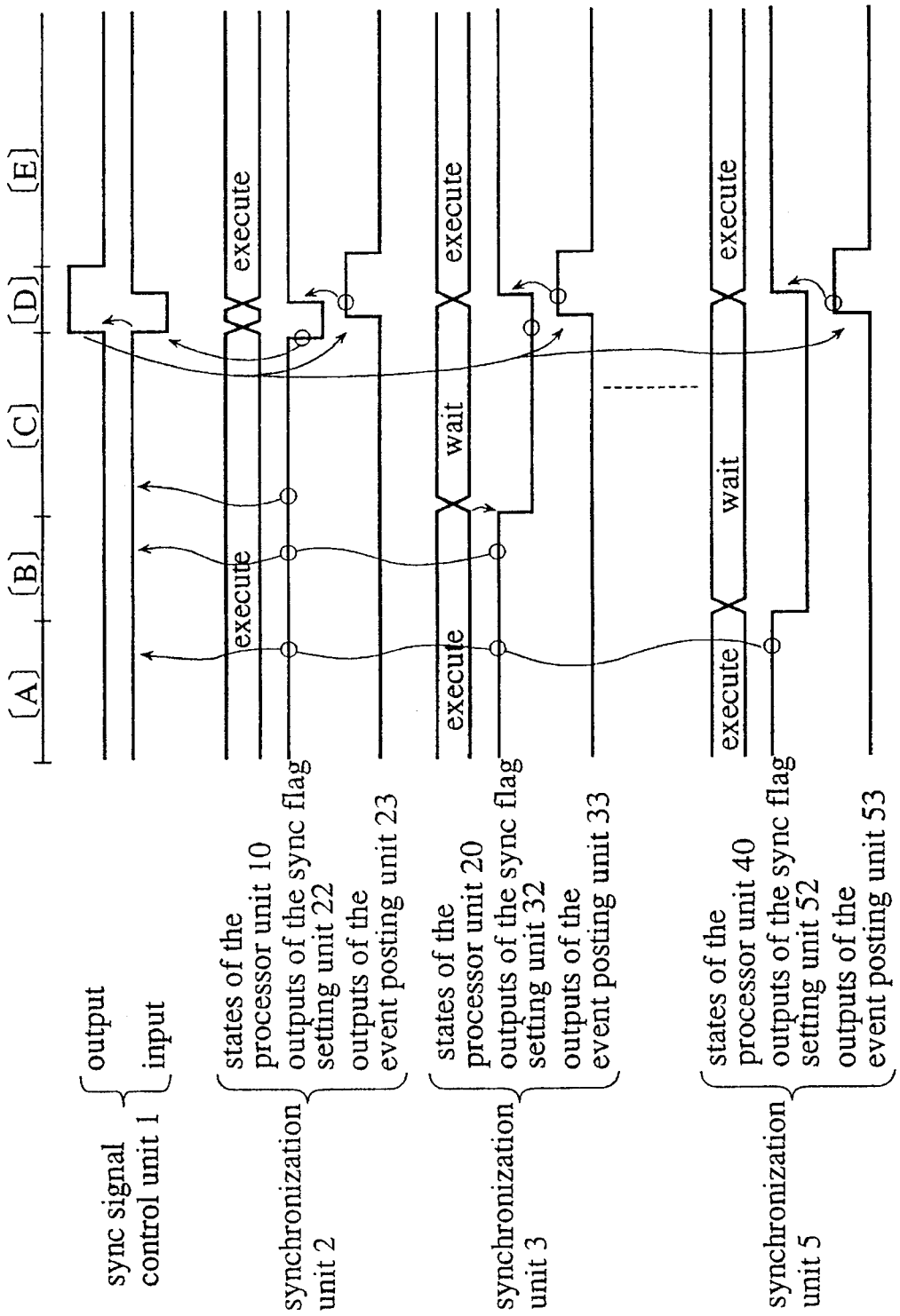
FIG. 6 is a time chart depicting the timing of a series of operations to be carried out by the apparatus according to Embodiment 1.

A series of operations to be carried out by the apparatus having the above-described construction proceeds as follows with reference to the time chart shown in FIG. 6.

First, the processor units 10–40 set "ones" as the initial values to the sync flag setting unit 22 of the synchronization units 2–5 respectively. As a result, the sync signals outputted from these synchronization units 2–5 become all "ones", while the sync signal outputted from the sync signal control unit 1 becomes a "zero". At the same time, the processor units 10–40 execute their processing. This state corresponds to the period [A] in FIG. 6.

Then, as shown in the period [B], the processor unit 40, which has completed its processing and entered the wait state, sets "zero" to the sync flag setting unit 52. As a result, the output of the OR circuit 51 becomes a "zero". In contrast, the OR circuits 21, 31, and 41 in the upper stream and the OR circuit 51 output "ones" because the sync flag setting unit 22, 32, and 42 output "ones".

The same holds true when the processor unit 20 has finished its processing as shown in the period [C], where all the processor units except the processor unit 10 are in the wait state.

At this moment, if the processor unit 10 has finished its processing as shown in the period [D], the sync flag setting unit 22, which is set to "one" by the processor unit 10, outputs a "zero". As a result, the output of the OR circuit 21 changes from "one" to "zero", so that the single shot 11a in the sync signal control unit 1 outputs a logical "one" pulse with the fixed width as a sync signal. The pulse is transmitted to the OR circuits 51, 41, 31, and 21 in this order via the sync signals.

The synchronization unit 2 carries out the following operations hereinafter, which are common to the other synchronization units 3–5.

The single shot 23a in the event posting unit 23 outputs a logical "one" pulse by the rising edge trigger, thereby setting "one" to the D-FF 22a of the sync flag setting unit 22. At the same time, the processor unit 10 is informed of the completion of a synchronization by the change of the output of the OR circuit 21 from "zero" to "one" through the 3-state buffer 24a in the I/F 24. This makes the processor unit 10 restart its processing.

All the sync flag setting units 22, 32, 42, and 52 are set "ones" at this moment, which indicates that they are back to their initial state as shown in the period [E]. Thus, a barrier synchronization is repeated in the same manner as mentioned above.

According to this embodiment, the sync signals traveling through a plurality of logical OR circuits connected in a loop allows the sync signal control unit 1 to be quickly informed of each state of the processor units 10–40 and all the processor units 10–40 to be quickly informed of the completion of a synchronization, thereby realizing high-speed barrier synchronization.

An interrupt generation unit may be provided instead of the I/F unit 24 of this embodiment. The interrupt generation unit can be constructed as the posting unit 117, which will be described in Embodiment 7 below.

<EMBODIMENT 2>

Figure 7:
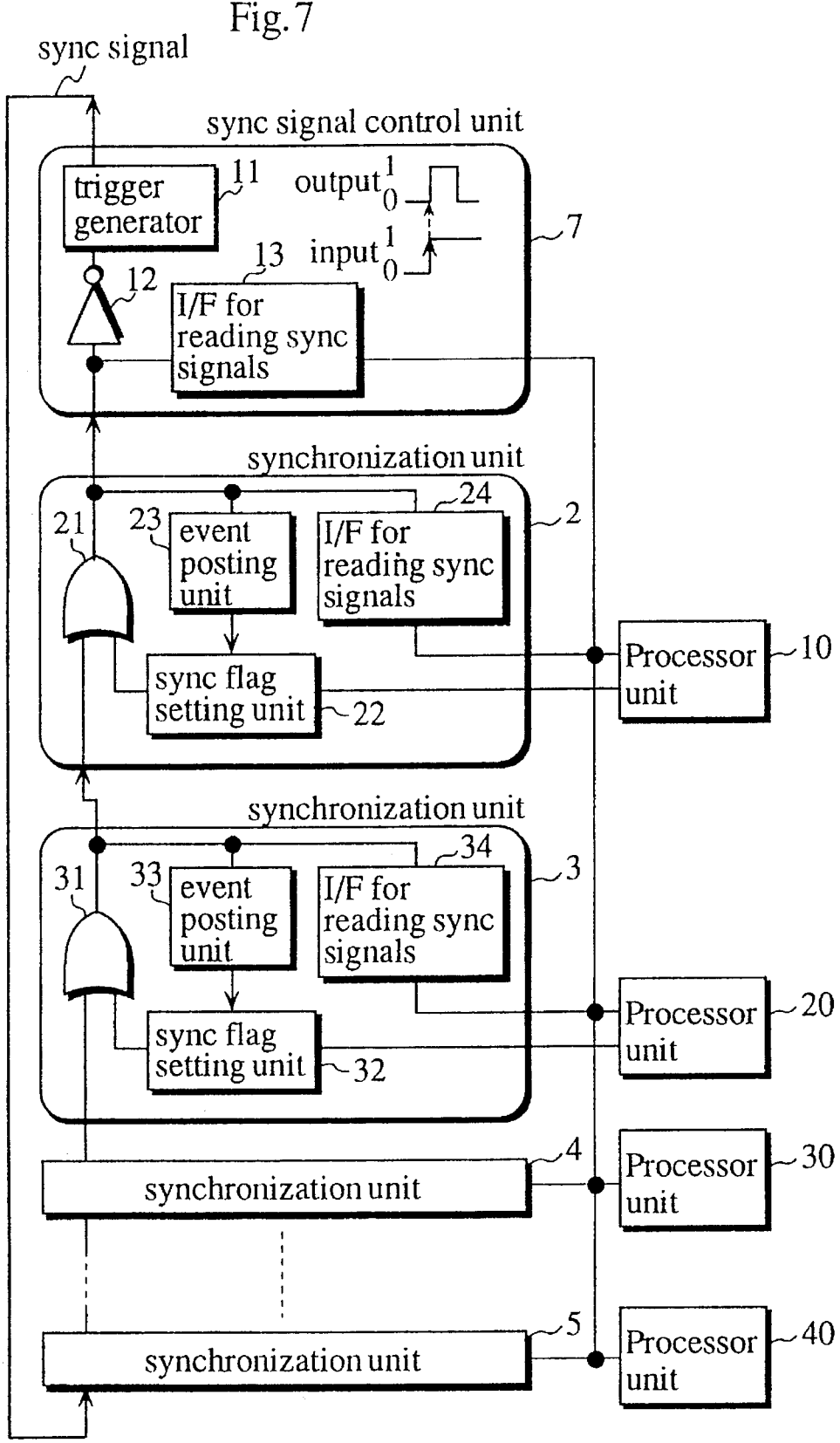
FIG. 7 is a block diagram showing the construction of the barrier synchronization apparatus according to Embodiment 2 of this invention.

The construction of the synchronization apparatus of this embodiment is shown in FIG. 7 in which like components are labeled with like reference numerals with respect to Embodiment 1. The description of these components is not repeated. This embodiment deals with an event synchronization. Therefore, the sync signal control unit 7 differs from the sync signal control unit 1 of Embodiment 1 in being provided with an inverter 12 and an I/F 13 for reading sync signals. The I/F 13 allows a processor unit that generates an event to check the completion of a synchronization.

Although the synchronization units are constructed the same as those in Embodiment 1, a flag to be set in the sync flag setting unit has a different meaning. That is, the flag is set a "zero" as the initial value by the processor unit, and when an event has been generated, a "one" is set to inform that the processor unit has entered the wait state. Consequently, sync signals also have a different meaning: as the sync signal, the sync signal control unit 7 outputs a logical "one" pulse with a fixed width to inform the completion of an event synchronization. The synchronization units 2–5 can output "ones" for indicating that an event has been generated by the processor and "zeros" for indicating no event generation.

Figure 8:
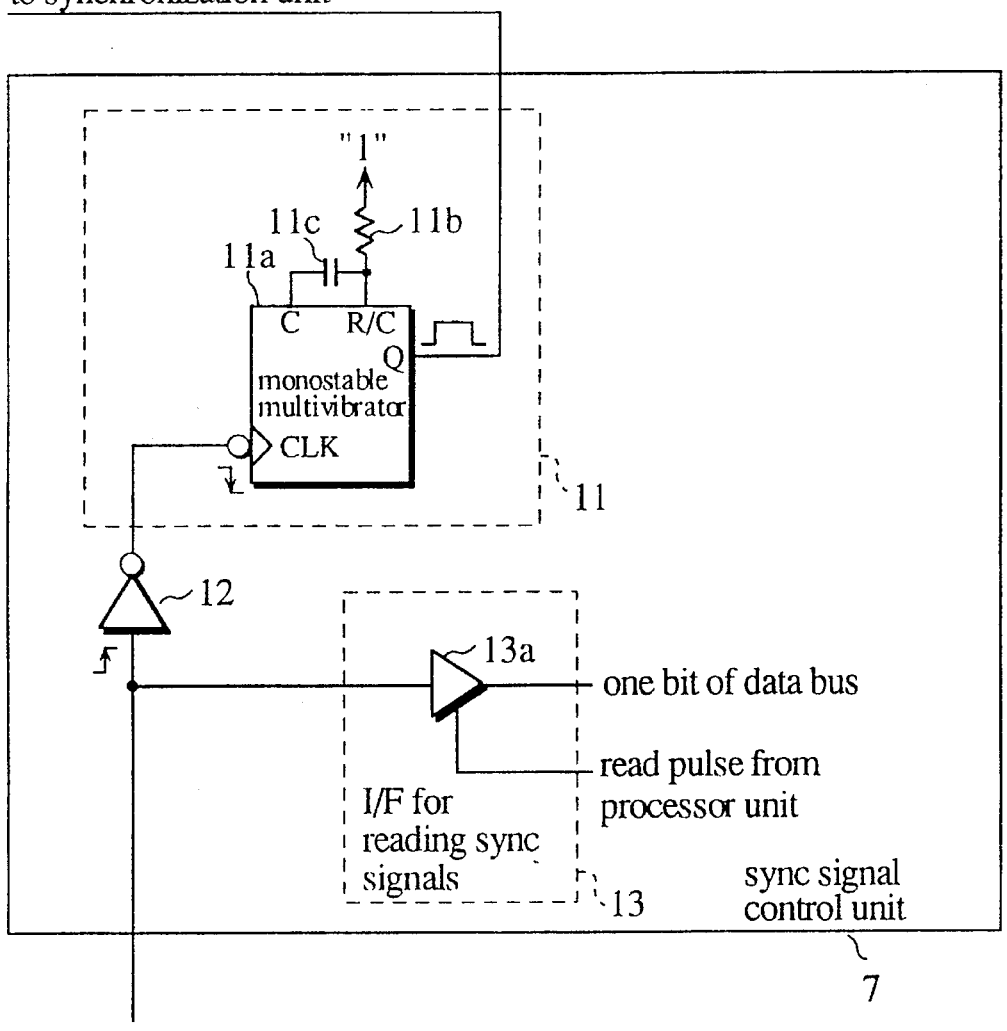
FIG. 8 is a specific circuit of the sync signal control unit 7 of the apparatus according to Embodiment 2.

FIG. 8 shows a specific circuit of the sync signal control unit 7, which is composed of the trigger generator 11, the inverter 12, and the I/F 13.

The inverter 12 reverses the sync signal sent from the synchronization unit 2. This is because the logical "one" indicates the generation of an event in this embodiment while the logical "zero" indicates the completion of a barrier synchronization in Embodiment 1.

The I/F 13 has a 3-state buffer 13a, which forwards the sync signal sent from the synchronization unit 2 to a predetermined bit position on the data bus, in response to the input of a read pulse from the processor which generated an event to its control terminal.

Figure 9:
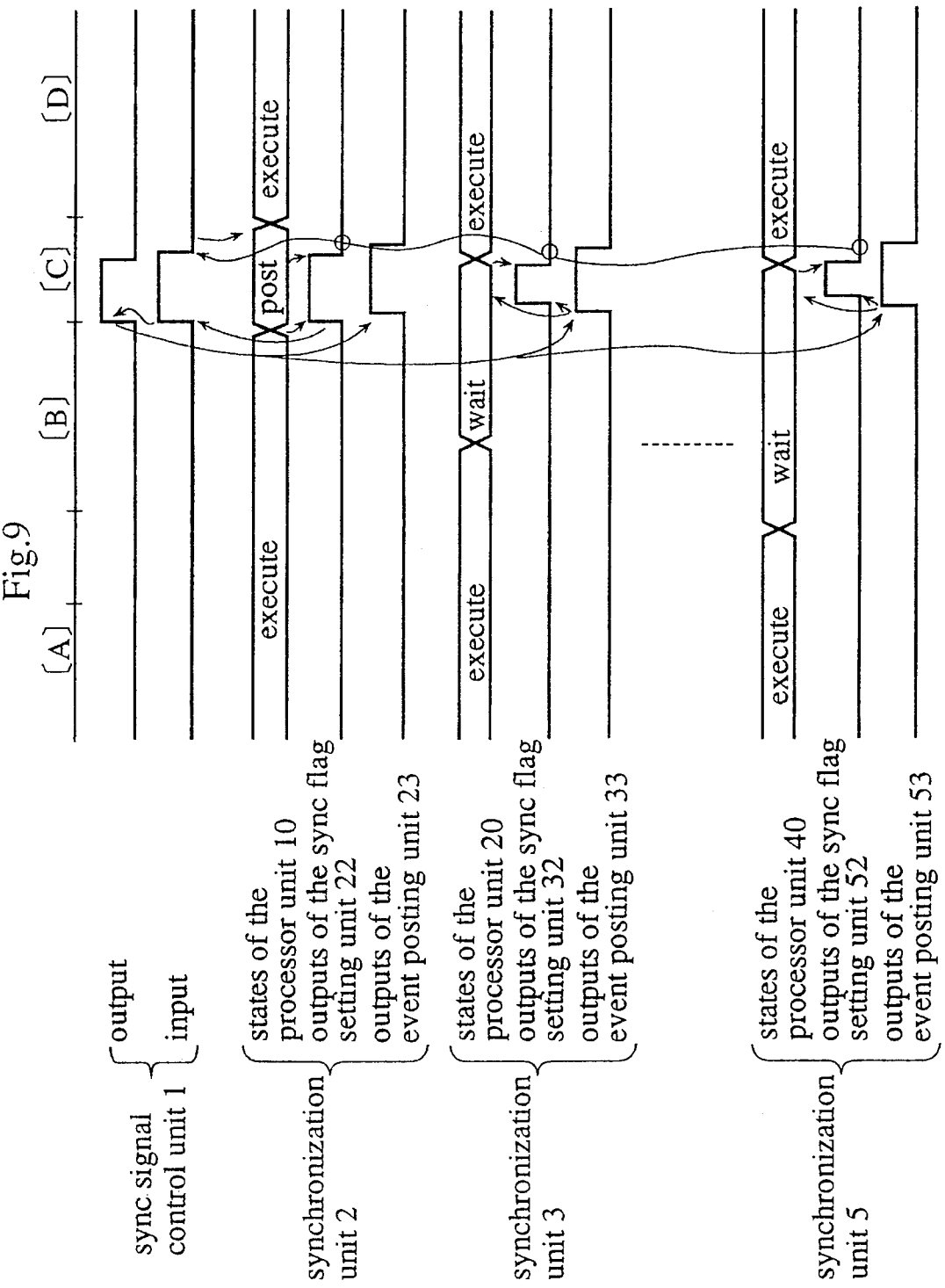
FIG. 9 is a time chart depicting the time of a series of operations to be carried out by the apparatus according to Embodiment 2.

A series of operations to be performed by the apparatus constructed as above is described as follows with reference to the time chart shown in FIG. 9.

Here, the processor unit 10 is appointed as the processor unit to generate events. The other processor units never generate events and are placed in the wait state after they have finished their processing.

First, the processor units 10–40 set "zeros" as the initial value to each sync flag setting unit 22 of the synchronization units 2–5 respectively. As a result, the values of sync signals outputted from these synchronization units 2–5 become all "zeros". Each of the signals is sent to the trigger generator 11 via the inverter 12, and the trigger generator 11 outputs a "zero". At the same time, the processor units 10–40 execute their processing. This state corresponds to the period [A] in FIG. 9.

Then, as shown in the period [B], the processor unit 40, which has completed its processing, enters the wait state. The value of the flag of the sync flag setting unit 52 and the output of the OR circuit 51 both remain "zero". The same holds true when the processor unit 20 itself has finished its processing. At this moment, all the processor units except the processor unit 10 are in the wait state.

If the processor unit 10 has finished its processing as shown in the period [C], the sync flag setting unit 22, which is set a "one" by the processor unit 10, outputs a "one". As a result, the output of the OR circuit 21 changes from "zero" to "one", so that the single shot 11a in the sync signal control unit 7 outputs a logical "one" pulse with a fixed width as a sync signal. The pulse is transmitted to the OR circuits 51, 41, 31, and 21 in this order via the sync signals.

Subsequent operations carried out by all the synchronization units 2–5 are the same as those in Embodiment 1 except for the following:

Since the event posting units set "ones" to the sync flag setting unit 22, the processor units, which have been informed of the completion of a synchronization by the I/F 13 must set "zeros" as the initial value to the sync flag setting unit 22 before restarting their processing. Generating an event, the processor unit 10 reads the value of the I/F 13. If the value is a "zero", it means that all the other processor units have restarted their processing. This state corresponds to the period [D] of FIG. 9. At this moment, another event synchronization can be executed in the same manner.

According to this embodiment, the sync signals traveling through a plurality of logical OR circuits positioned in a loop allows the sync signal control unit 7 to be quickly informed of each state of the processor units 10–40 and all the processor units 10–40 to be quickly informed of the completion of a synchronization, thereby realizing high-speed event synchronization.

More than one sync signal control units can be applied to the synchronization units in this embodiment.

A trigger which detects a rising edge and outputs a logical "one" pulse with a fixed width can be applied instead of a pair of the trigger generator 11 and the inverter 12 positioned before the input terminal of the trigger generator 11.

Furthermore, a switch for selecting between the input signal and the output signal of the inverter 12 to be sent to the input terminal of the trigger generator 11 can be provided so that either the barrier synchronization of Embodiment 1 or the event synchronization of Embodiment 2 can be selected.

<EMBODIMENT 3>

Figure 10:
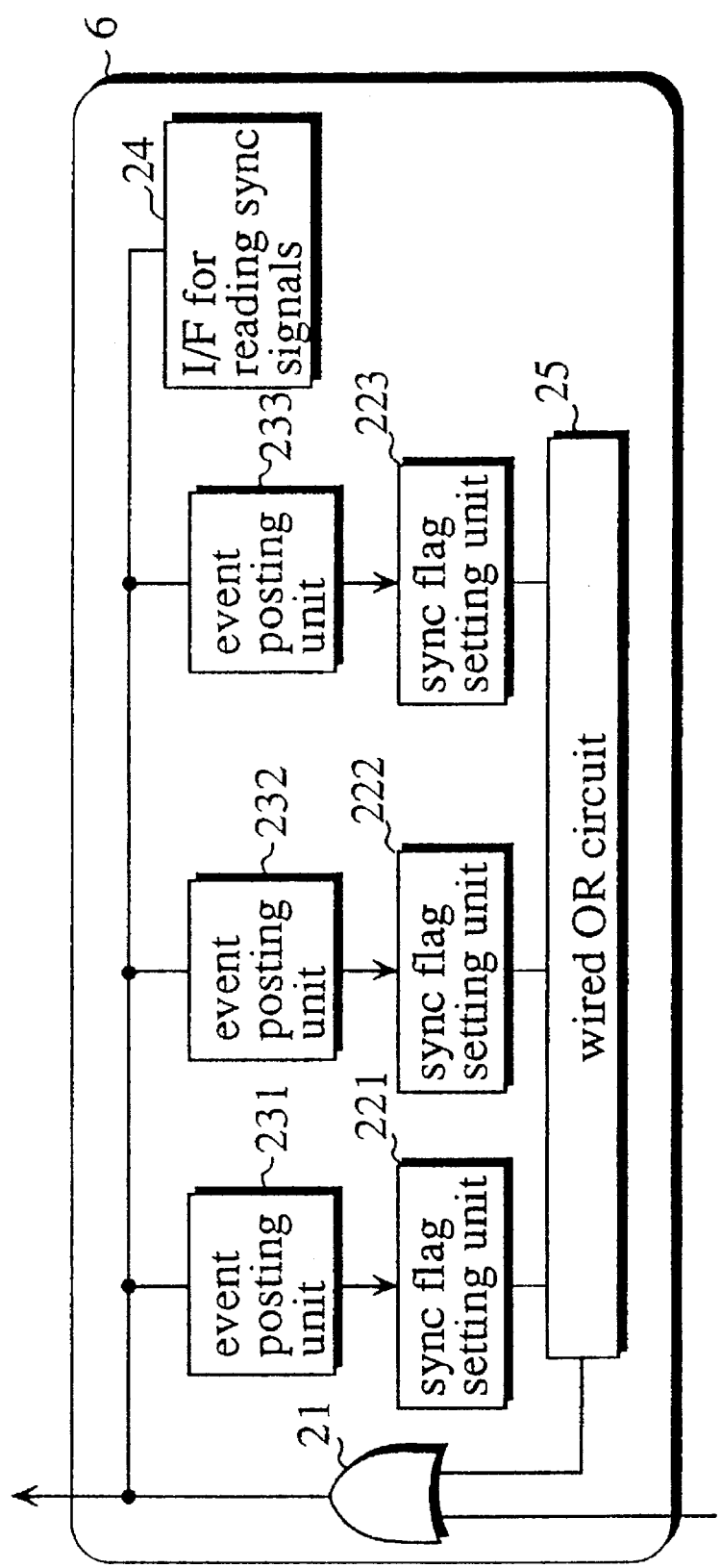
FIG. 10 is the construction of the synchronization unit of the apparatus of Embodiment 3.

FIG. 10 shows the construction of the synchronization unit 6 as a component of the synchronization apparatus of this embodiment. The synchronization unit 6, which is provided with an OR circuit 21, sync flag setting units 221–223, event posting units 231–233, an I/F 24 for reading sync signals, and a wired OR circuit 25, can replace any of the synchronization units 2–5 of Embodiments 1 and 2.

The OR circuit 21 ORs the sync signal sent from a synchronization unit in the upper stream with an output signal of the wired OR circuit 25, then outputs the value to either the sync signal control unit 1 or a synchronization unit in the down stream.

The wired OR circuit 25 ORs all the output signals of the sync flag setting units 221–223, and outputs the value to the OR circuit 21.

The sync flag setting units 221–223, event posting units 231–233, an I/F 24 are not described because they are equal to those in Embodiments 1 and 2.

Figure 11:
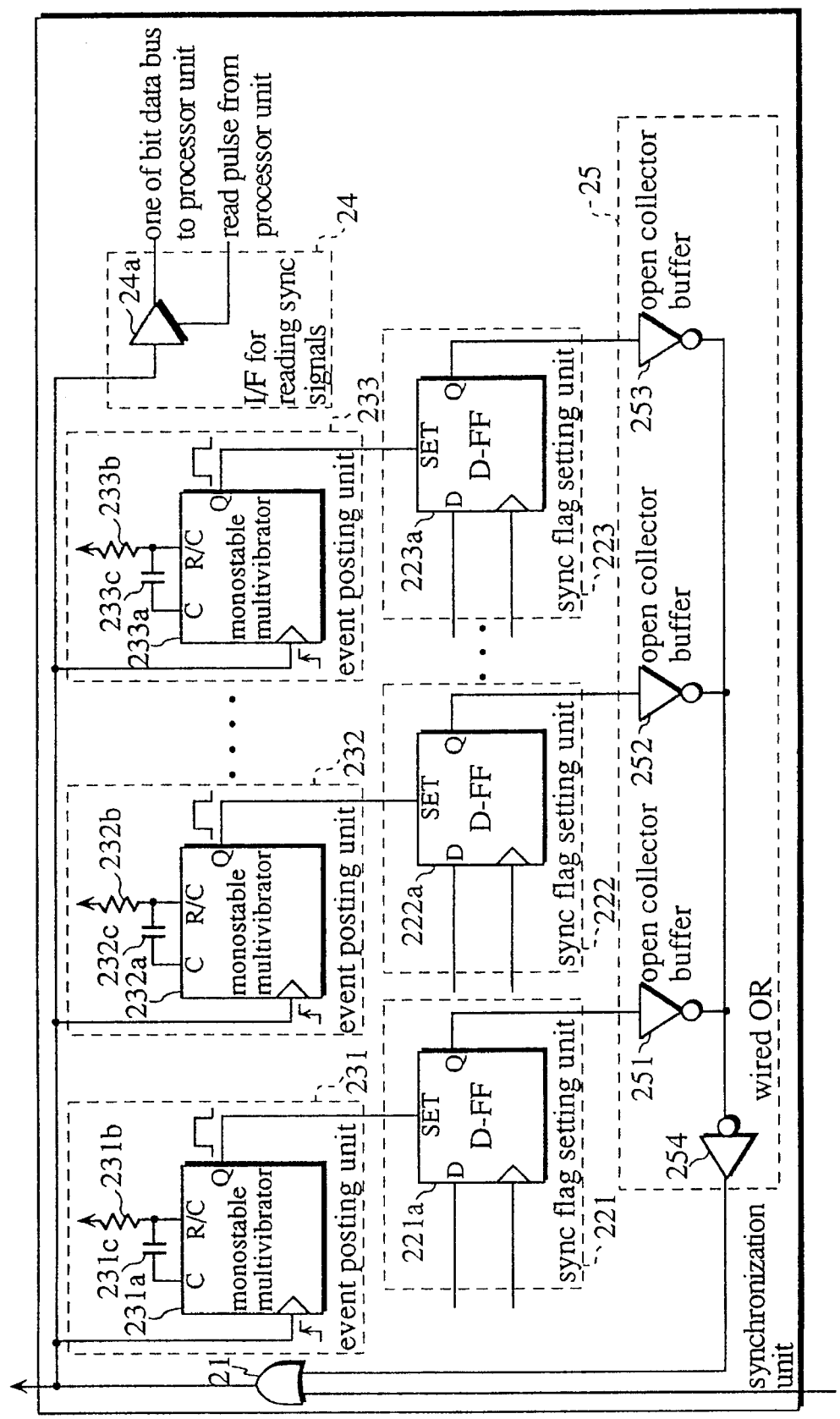
FIG. 11 is a specific circuit of the synchronization unit 6.

FIG. 11 shows a specific circuit of the synchronization unit 6. The sync flag setting units 221–223, event posting units 231–233, I/F 24 are not described because they are equal to those in Embodiments 1 and 2.

The wired OR circuit 25, which is provided with open collector buffers 251–253 and a NOT gate 254, wired-ORs all the outputs of these buffers, inverts an obtained value by the NOT gate 254, and outputs the inverted value to the OR circuit 21. The wired-OR line formed by the wired OR circuit 25 is connected with a full-up resistance (not shown).

A series of operations to be carried out by the synchronization unit 6 constructed as above is described as follows.
(BARRIER SYNCHRONIZATION)

When a barrier synchronization is carried out in the same manner as Embodiment 1, the processor units connected with respective sync flag setting units 221–223 set the initial value "ones" to the respective flags. As a result, the output of the wired OR circuit 25 becomes "one". Consequently, an input of the OR circuit 21 becomes "one".

Unless all the sync flag setting units 221–223 become "zeros", the output of the wired OR circuit 25 remains "one". This means that the value obtained by the barrier synchronization among the sync flag setting units 221–223 becomes the input of the OR circuit 21.

Once the input of the OR circuit 21 becomes "zero", another barrier synchronization is attained by the same operations as Embodiment 1.
(EVENT SYNCHRONIZATION)

When an event synchronization is carried out in the same manner as Embodiment 2, the processor units connected with respective sync flag setting unit 221–223 set the initial value "zeros" to the respective flags. As a result, the output of the wired OR circuit 25 becomes "zero". When any one of the values of the sync flag setting units 221–223 becomes "one", the output of the wired OR circuit 25 becomes "one". This means that the value obtained by the event synchronization among the sync flag setting units 221–223 becomes the input of the OR circuit 21.

Once the input of the OR circuit 21 becomes "one", another event synchronization is carried out by the same operations as Embodiment 2.

Although a plurality of sync flag setting units and event posting units in pair are provided in this embodiment, a plurality of I/F can be added.

According to this embodiment, a plurality of sync flag setting units and event porting units in pair are provided in a synchronization apparatus and all the outputs of these event posting units are ORed, thereby attaining a high-speed barrier or event synchronization, without substantial increase in the size of the apparatus.

<EMBODIMENT 4>

Figure 12:
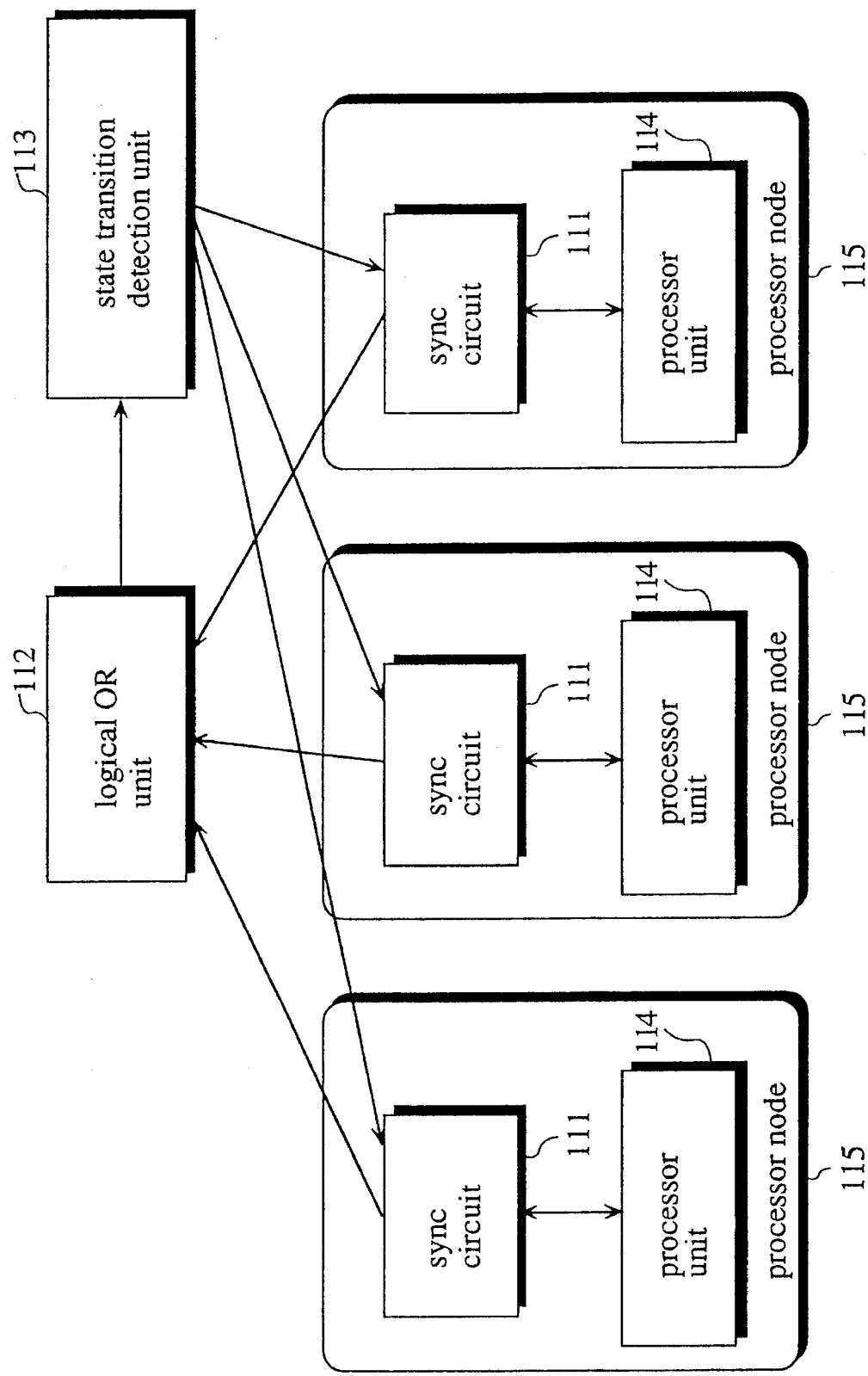
FIG. 12 is a block diagram showing the construction of the apparatus of Embodiment 4.

The construction of the synchronization apparatus of this embodiment is shown in FIG. 12. The apparatus is provided with a logical OR unit 112, a state transition detection unit 113, and a plurality of processor nodes 115 each having a sync circuit 111 and a processor unit 114. Each processor 114 executes their processing.

The sync circuit 111 is set to "one" as the initial value by the processor unit 114 and "zero" when the processor 114 enters the wait state.

The logical OR unit 112 ORs the outputs of the plurality of sync circuits 111, and outputs the value to the state transition detection unit 112.

The state transition detection unit 113 detects that the output of the logical OR unit 112 changes from "zero" to "one" and sets "one" to the sync circuit 111.

Figure 13:
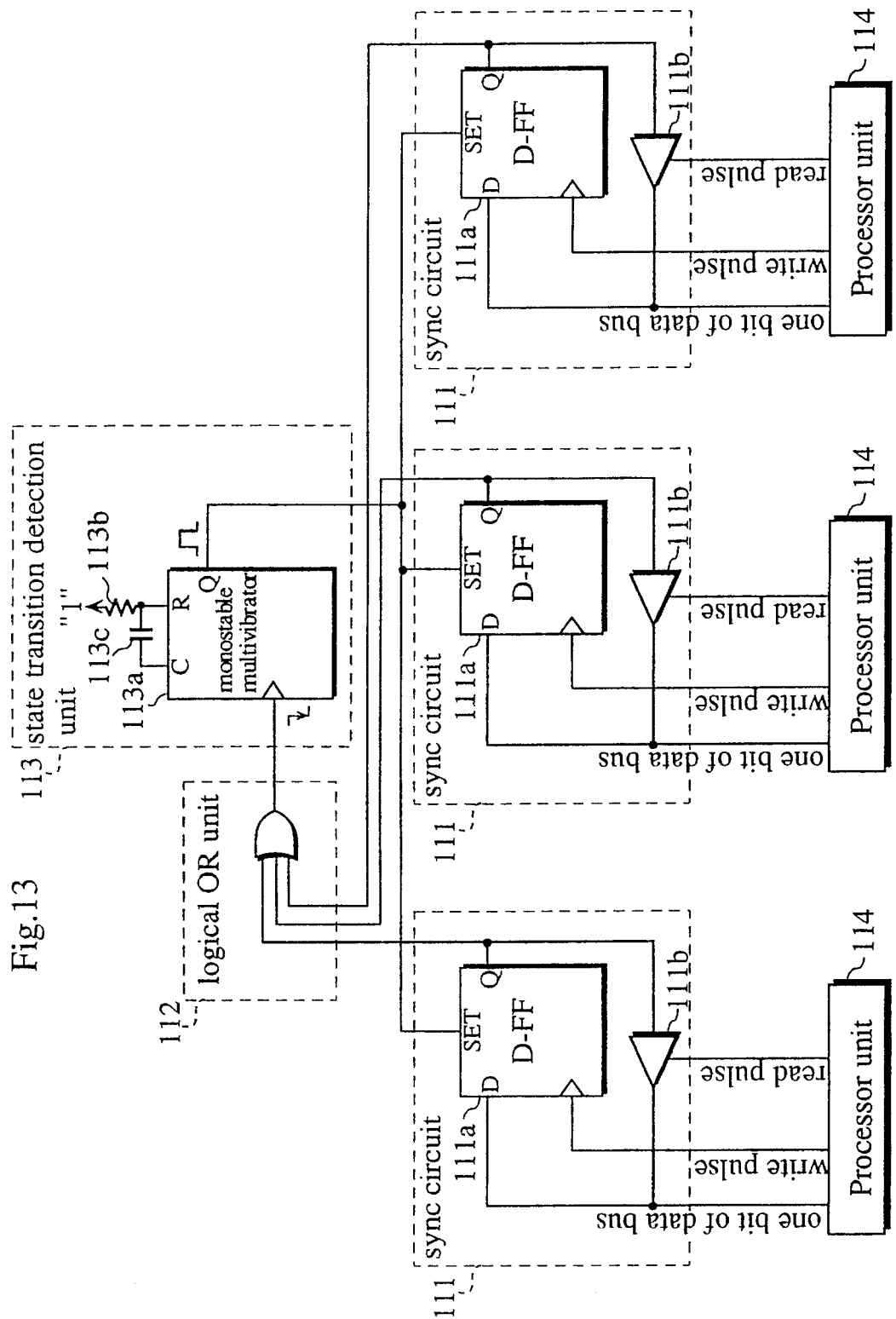
FIG. 13 is a specific circuit of the apparatus of Embodiment 4.

FIG. 13 is a specific circuit of the apparatus of this embodiment shown in FIG. 12. The sync circuit 111 is composed of a D-FF 111a and a 3-state buffer 111b.

In accordance with a write pulse sent from the processor unit 114, the D input terminal of the D-FF 111a receives a value of the sync flag sent from the processor unit 114 as a predetermined bit in the data bus. The value received is outputted through the Q output terminal to the logical OR unit 112.

In accordance with a read pulse sent from the processor unit 114, the 3-state buffer 111b outputs the value of the Q output terminal to the processor unit 114 through a predetermined bit in the data bus.

The logical OR unit 112 is provided with a 3-input OR circuit for receiving outputs of the D-FF 111a.

The state transition detection unit 113 is composed of a single shot 113a, a resistance 113b, and a capacitor 113c. The single shot 113a detects the falling edge of an output signal of the logical OR unit 112 and outputs a logical "one" pulse with a fixed width. The width is determined by a time constant circuit consisting of the resistance 113b and the capacitor 113c.

A series of operations to be carried out by the above-constructed apparatus of this embodiment is described as follows.

When parallel processing among all the processor units are synchronized, each processor unit sets "one" as the initial value to the D-FF 111a and executes its processing.

Having completed their processing, the processor units write "zeros" to the respective D-FFs 111a to inform that they are in the wait state. The "zeros" thus written are outputted to the logical OR unit 112.

The value of the logical OR unit 112 changes from "one" to "zero" at the moment that all the inputs become "zeros", i.e., all the processor units have finished their processing. Responding to the detection of a change, the state transition detection unit 113 outputs a logical "one" pulse with a fixed width to the sync circuit 111 informing the completion of a synchronization.

The logical "one" pulse sets "one" to the D-FF 111a. The value set is read out by the processor units via the 3-state buffer 111b. As a result, the processor units restart their processing and the sync circuits 111 return to their initial state. Hereinafter these operations are repeated and a synchronization is achieved repeatedly.

As described above, according to the apparatus of this embodiment, the state transition detection unit 113 writes a "one" to all the sync circuits when it detects a change in the output value of the logical OR unit, thereby attaining both high-speed initialization and high-speed iterative synchronization.

<EMBODIMENT 5>

Figure 14:
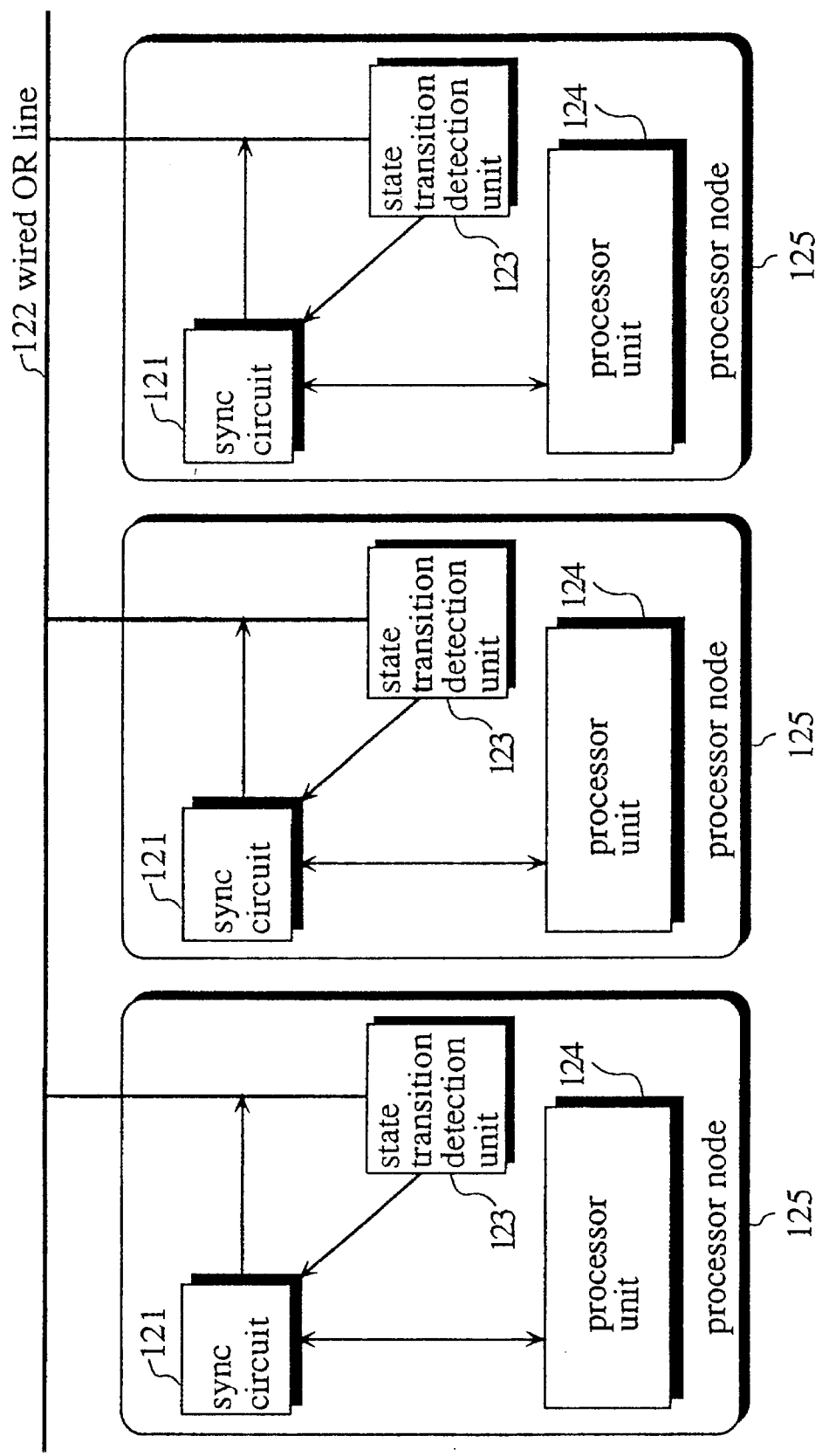
FIG. 14 is a block diagram showing the construction of the apparatus of Embodiment 5.

The construction of the synchronization apparatus of this embodiment is shown in FIG. 14. The apparatus has a plurality of processor nodes 125 each connected with a wired OR line 122. Each processor node 125 is provided with a sync circuit 121, a state transition detection unit 123, and a processor unit. Unlike Embodiment 4 having the single state transition detection unit 113, a state transition detection unit 123 equivalent to the state transition unit 113 is provided to each processor node in this embodiment.

The sync circuit 121 is set to "one" as the initial value by the processor 124 and "zero" when the processor 124 enters the wait state.

The wired OR line 122, which corresponds to the logical OR unit 112 in Embodiment 4, ORs the outputs of all the sync circuits 121.

The state transition detection unit 123 detects that the output of the wired OR unit 122 changes from "zero" to "one" and sets to "one" the sync circuit 121.

Figure 15:
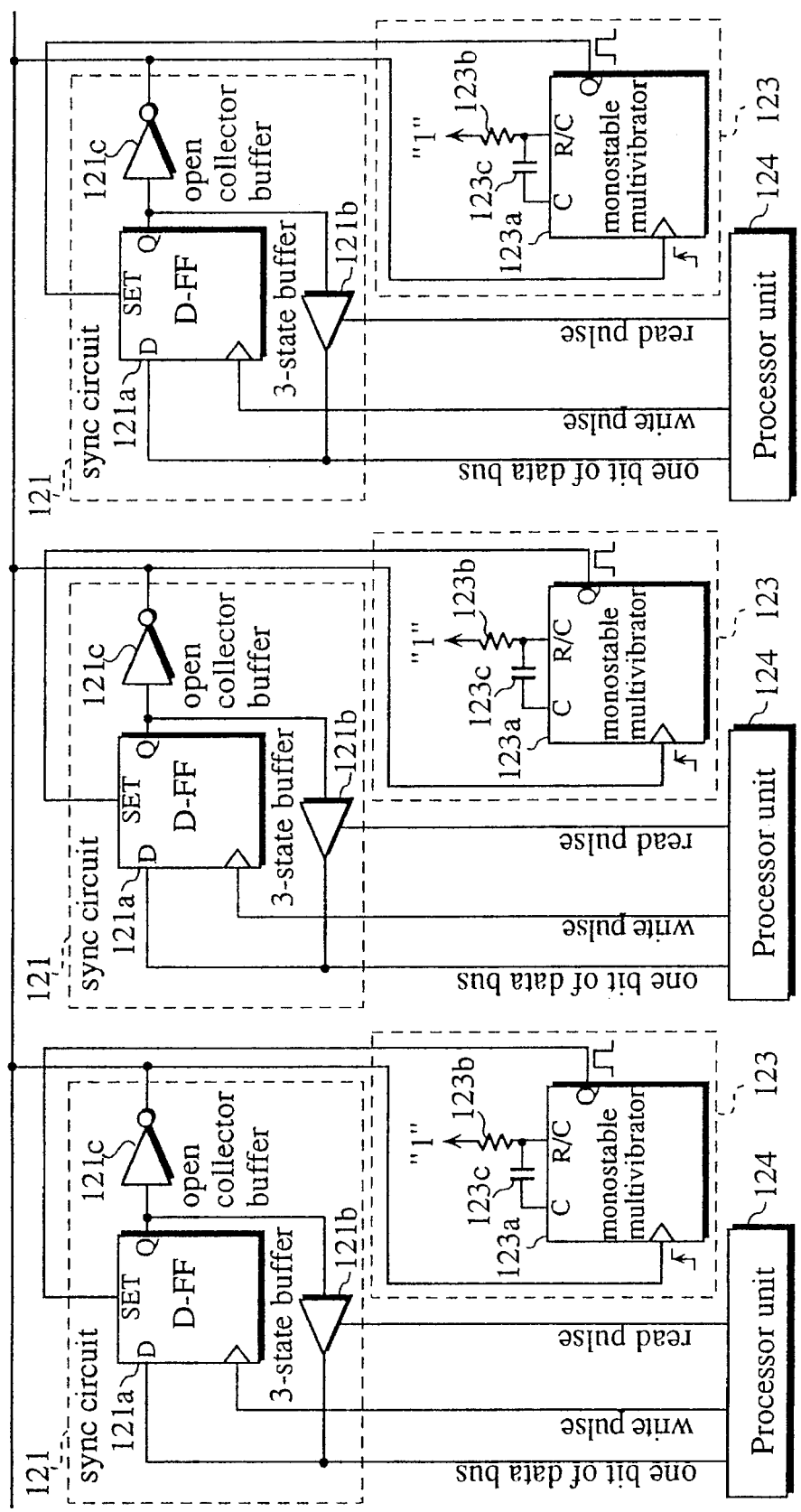
FIG. 15 is a specific circuit of the apparatus of Embodiment 5.

FIG. 15 shows a specific circuit of the apparatus of this embodiment shown in FIG. 14. The sync circuit 121 is composed of a D-FF 121a, a 3-state buffer 121b, and an open collector buffer 121c. The sync circuit 121 is equal to the sync circuit 111 in Embodiment 4 except that the output of the D-FF 121a is sent through the open collector buffer 121c.

The state transition detection unit 123, like the equivalent unit 123 in Embodiment 4, is composed of a single shot 123a, a resistance 123b, and a capacitor 123c. The only difference is that the input and output terminals of the single shot 123a are connected respectively with the wired OR line 122 and the set terminal of the D-FF 121a, and the single shot 123a detects rising edges.

The operations carried out by the above-constructed apparatus of this embodiment are not described because they are equal to those in Embodiment 4.

According to the apparatus of this embodiment, all the processor nodes are connected with a single signal wired OR line having a full-up resistance (not shown), thereby achieving a synchronization apparatus with simper construction.

<EMBODIMENT 6>

Figure 16:
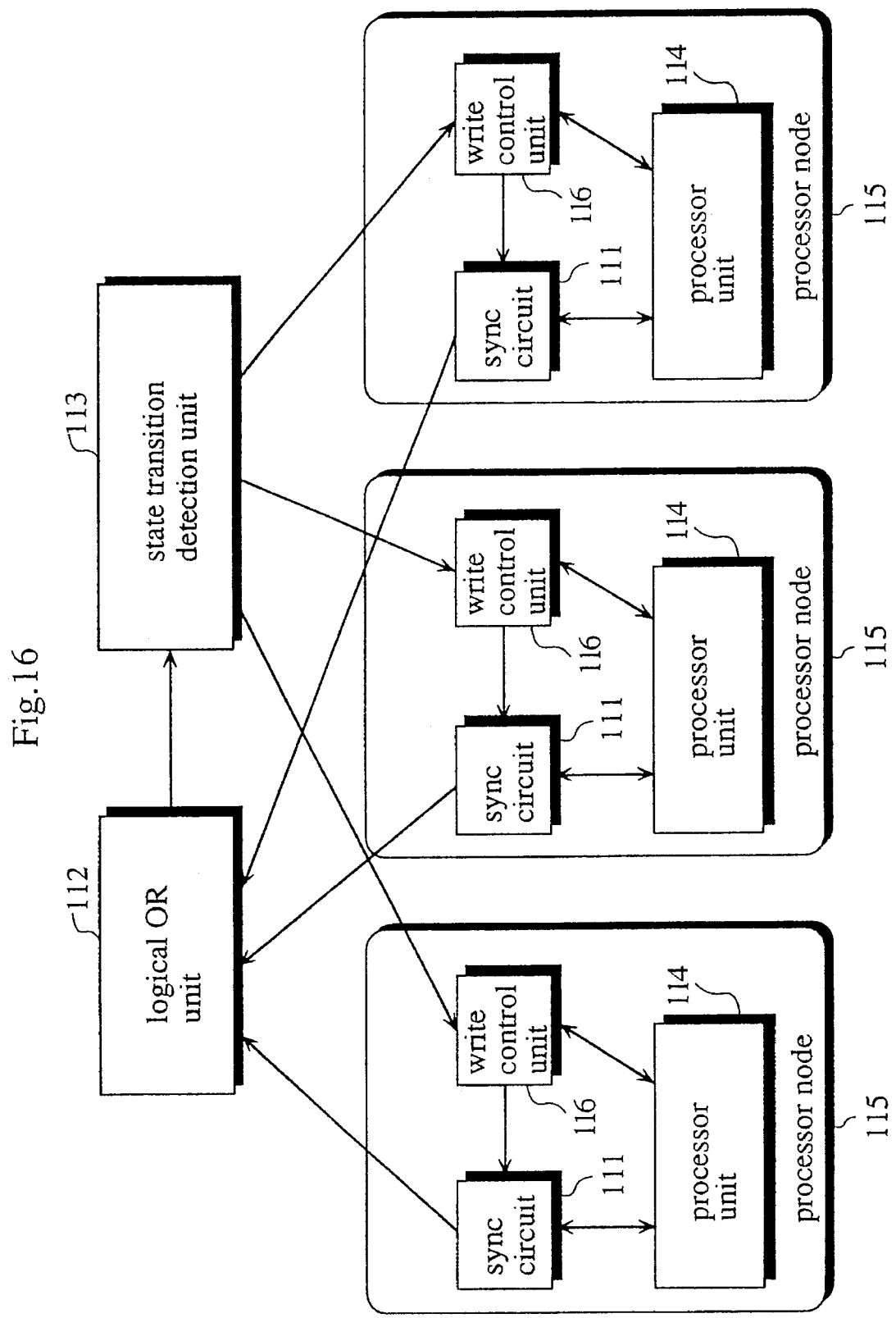
FIG. 16 is a block diagram showing the construction of the apparatus of Embodiment 6.

The construction of the synchronization apparatus of this embodiment is shown in FIG. 16. In the apparatus, a write control unit 116 is additionally provided to each processor node used in Embodiment 4. The features different from Embodiment 4 only are described as follows.

The write control unit 116 permits or prohibits the state transition detection unit 113 to write to the sync circuit 111, depending on a direction of the processor unit 114.

Figure 17:
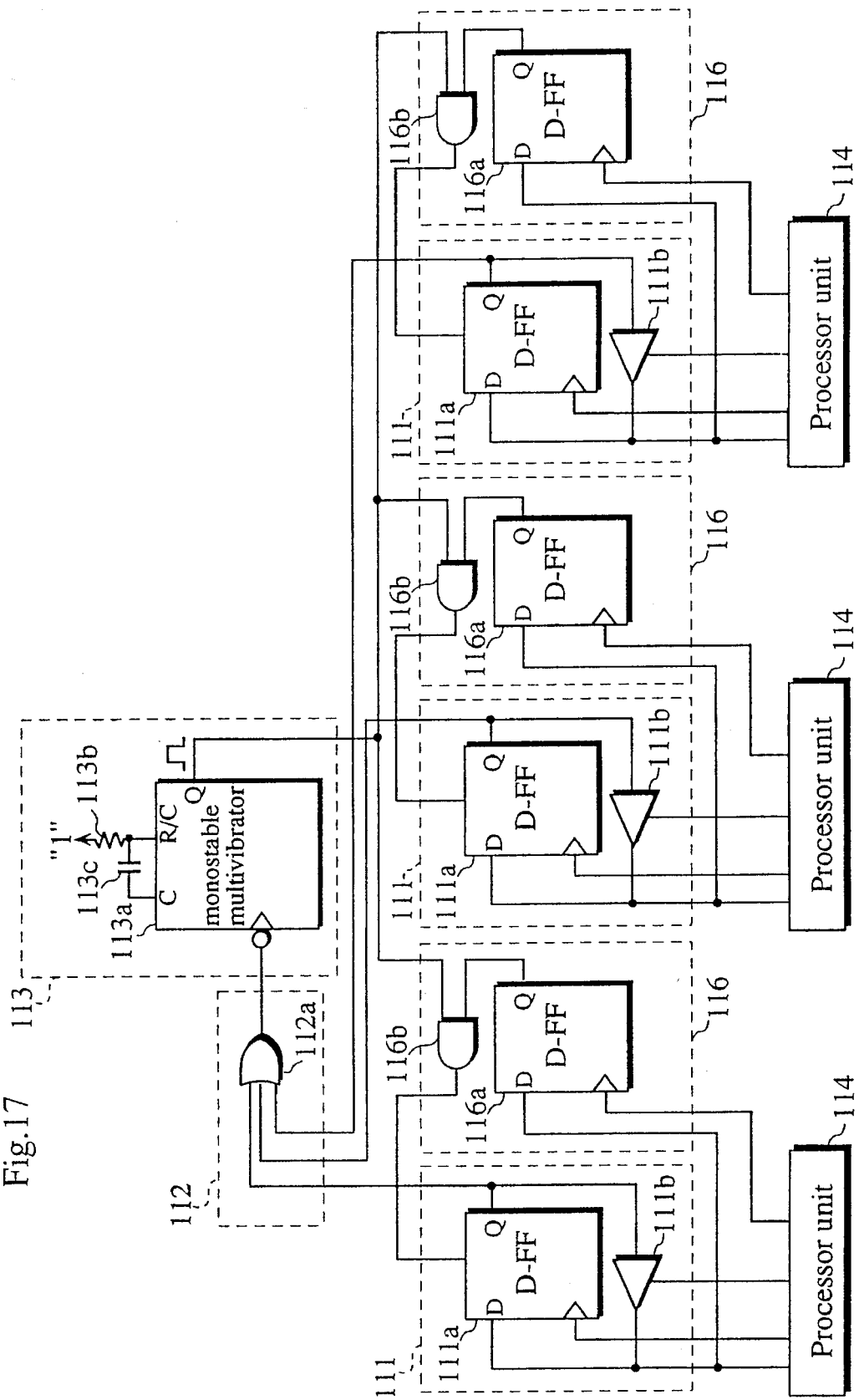
FIG. 17 is a specific circuit of the apparatus of Embodiment 6.

FIG. 17 shows a specific circuit of the apparatus shown in FIG. 16.

The write control unit 116 is composed of a D-FF 116a and a AND circuit 116b.

In accordance with a write pulse sent from the processor 114, the D input terminal of the D-FF 116a receives a value of the prohibition/permission flag from the processor unit 114 through a predetermined bit in the data bus. The value received is outputted to the AND circuit 116b through the Q output terminal. The values "1" and "0" respectively indicate a permission and a prohibition for writing.

The AND circuit 116b ANDs the write signal sent from the state transition detection unit 113 to the sync circuit 111 with the output of the D-FF 116a: when the value of the permission/prohibition flag is "one", the write signal is lead to the sync circuit 111, and when the value is "zero", the signal is suspended.

A series of operations to be carried out by the apparatus of this embodiment constructed as above is described as follows.

Synchronization is applied only to those processor nodes having a write control unit 116 whose permission/prohibition flag is set "one". The operations of these processor nodes are equal to those in Embodiment 4.

The following is a description on the remaining processor nodes, which are eliminated from the subjects of synchronization.

The sync circuits 111 are initialized to "ones". To eliminate the processor nodes, the processor unit 114 sets a "zero" to the write control unit 116, thereby prohibiting the state transition detection unit 113 to write to the sync circuit 111. At the same time, the processor unit 114 sets a "zero" to the sync circuit 111 so as to avoid that the other processor units are prevented from being synchronized.

As described above, according to the apparatus of this embodiment, any desired processor nodes can be eliminated from the subjects of synchronization.

<EMBODIMENT 7>

Figure 18:
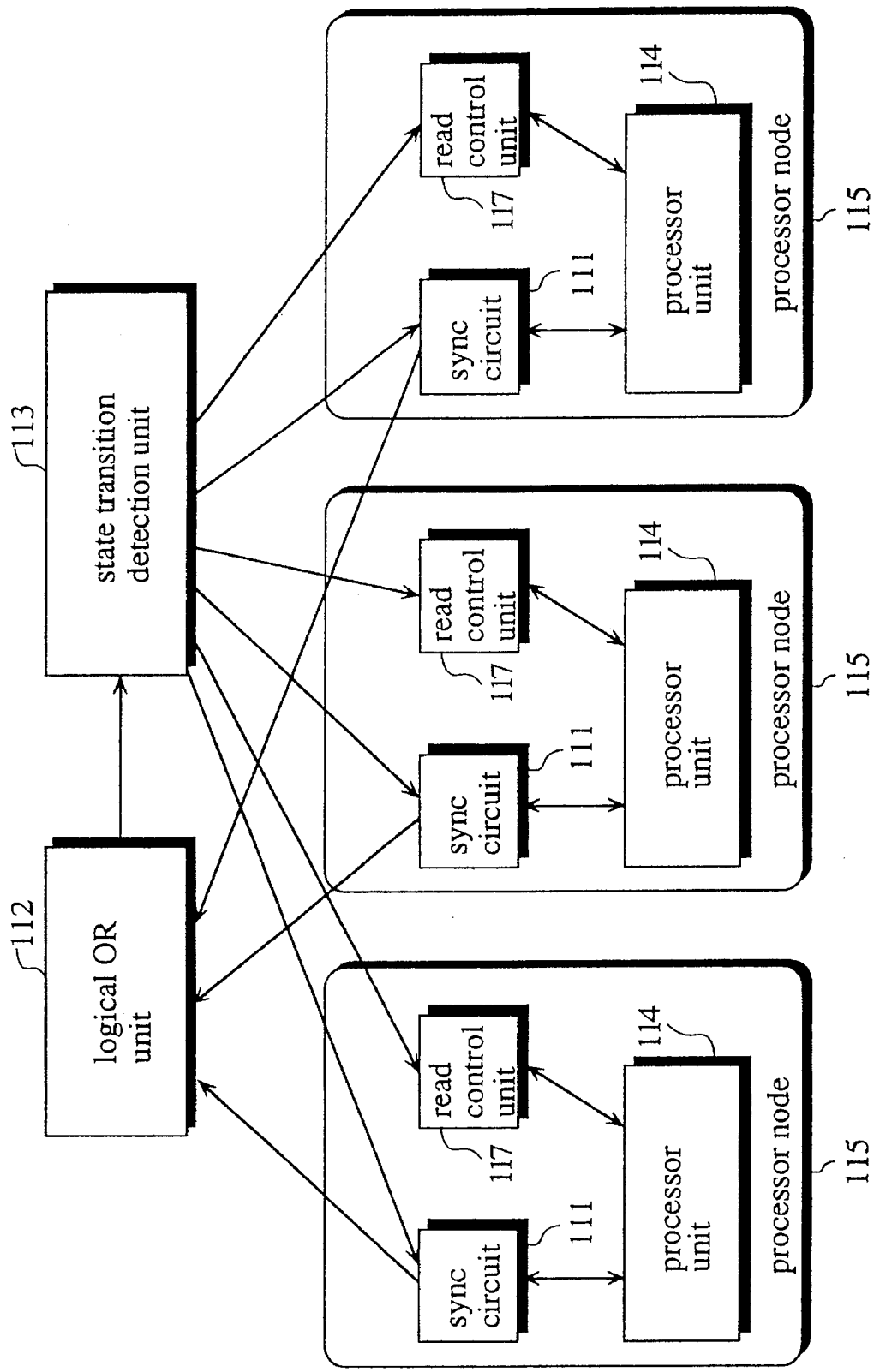
FIG. 18 is a block diagram showing the construction of the apparatus of Embodiment 7.

The construction of the synchronization apparatus of this embodiment is shown in FIG. 18. In the apparatus, a posting unit 117 is additionally provided to each processor node used in Embodiment 4 so that the processor units can be informed of the completion of a synchronization through an interrupt signal sent from the posting unit 117. The features different from Embodiment 4 only are described as follows.

When the state transition detection unit 113 detects the completion of a synchronization, the posting unit 117 generates an interrupt to the processor unit 114, thereby informing the completion of a synchronization.

Figure 19:
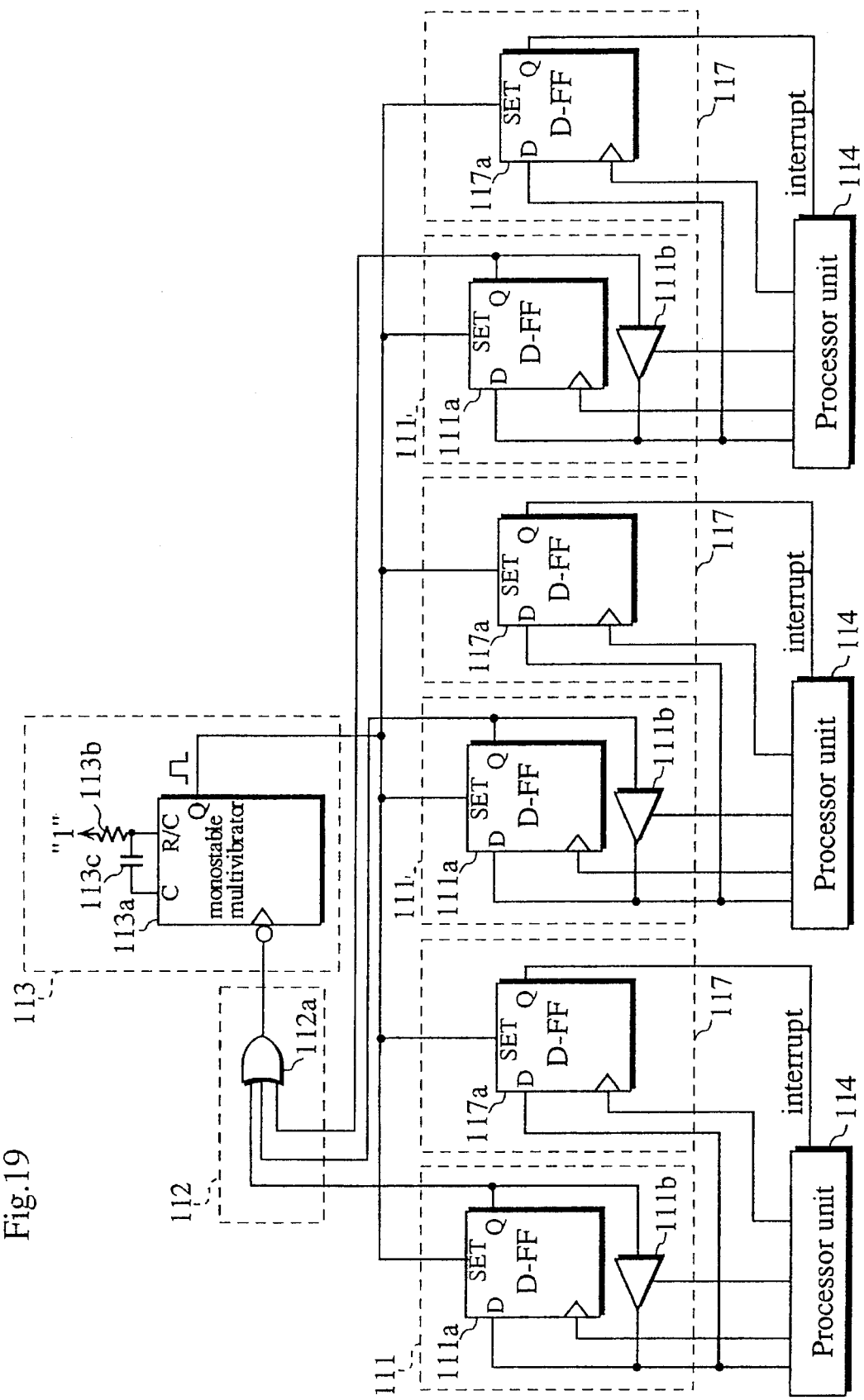
FIG. 19 is a specific circuit of the apparatus of Embodiment 7.

FIG. 19 shows a specific circuit of the apparatus shown in FIG. 18. The posting unit 117 has a D-FF 117a. The set terminal of the D-FF 117a receives a write signal from the state transition detection unit 113. Like the D-FF 111a, the D-FF 117a is set to "one" when a synchronization is completed. The value "one" of the Q output terminal, which is connected with the interrupt input of the processor 114, indicates an occurrence of an interrupt to the processor 114. After the occurrence, the D input terminal writes "zero" to the processor 114 through a predetermined bit in the data bus, in accordance with a write pulse sent from the processor unit 114. As a result, the D-FF 111a is reset to "zero", thereby clearing the interrupt.

A series of operations to be carried out by the apparatus of this embodiment constructed as above is described as follows.

All the sync circuits 111 are initialized to "ones" and all the posting units 117 to "zeros".

When parallel processing of all the processors units 114 are synchronized, each processor 114 waits for an occurrence of interrupt after it has finished writing to the sync circuit 111. Therefore, each processor 114 can afford to perform another operation until the occurrence.

When the values of all the sync circuits 111 become "zeros", the output of the logical OR unit 112 changes from "one" to "zero", so that the state transition detection unit 113 sets "one" to all the sync circuits 111 and all the posting units 117.

Any posting unit 117 which is set to "one" generates an interrupt to the respective processor unit 114, and the processor which received the interrupt later writes a "zero" to the posting unit 117, resetting the posting unit 117 which generated the interrupt. These operations are repeated for iterative synchronization.

According to the synchronization apparatus of this embodiment, each processor, which is informed of the completion of an interrupt by the posting unit 117, can afford to perform another operation while waiting for a synchronization.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be constructed as being included therein.

What is claimed is:

1. An apparatus for synchronizing parallel processing among a plurality of processors, comprising:

a control unit; and a plurality of synchronization units corresponding to said plurality of processors, respectively, said control unit and said synchronization units being connected in a loop, wherein each of said synchronization units outputs a synchronization signal for informing that said each synchronization unit has entered a wait state to a respective adjacent downstream unit; and said control unit outputs a pulse for informing a completion of synchronization among said processors to an uppermost-stream synchronization unit, said pulse being forwarded as far as a lowermost-stream synchronization unit, wherein each of said synchronization units comprises:

a flag hold means for holding a flag indicating a state of a respective one of said processors;

a logical OR means for ORing a said synchronization signal sent from an adjacent upstream synchronization unit with a value of said flag and for outputting an obtained value to an adjacent downstream synchronization unit as a said synchronization signal;

a detection means for detecting said pulse outputted by said control unit in said synchronization signal outputted from said logical OR means, thereby initializing said flag hold means; and an output means for outputting said value outputted from said logical OR means to a respective one of said processors.

2. The apparatus of claim 1, wherein said flag has a value of one of a logical one and a logical zero, said logical one indicating that a respective one of said processors is in operation and said logical zero indicating that a respective one of said processor is in a wait state, and said control means detects a change from said logical one to said logical zero, thereby outputting said pulse, said pulse being a logical one pulse with a fixed width.

3. The apparatus of claim 2, wherein said control means comprises a negative edge-triggered single shot circuit for outputting said logical one pulse when a negative edge is detected in a said synchronization signal sent from said lowermost-stream synchronization unit.

4. The apparatus of claim 3, wherein said logical OR means comprises an OR gate for receiving a said synchronization signal from an adjacent upstream synchronization unit and a value of said flag and for outputting a logical OR to an adjacent downstream synchronization unit as a said synchronization signal.

5. The apparatus of claim 4, wherein said flag hold means comprises a flip-flop for holding a value of said flag and for outputting said value to said OR gate.

6. The apparatus of claim 5, wherein said detection means comprises a positive edge triggered single shot circuit for outputting said pulse to said flip-flop when a positive edge is detected in a said logical OR outputted from said OR gate, and wherein said flip-flop comprises a set terminal for receiving an output of said positive edge triggered single shot circuit, said set terminal being set a logical one by said logical one pulse.

7. The apparatus of claim 6, wherein said output means comprises a tri-state buffer for receiving said logical OR from said logical OR means and for outputting an obtained value under a control of a read signal sent from a respective one of said processors.

8. The apparatus of claim 6, wherein said output means comprises an interrupt generation circuit for detecting said positive edge in the logical OR and for outputting a signal for requesting an interrupt to a respective one of said processors.

9. The apparatus of claim 8, wherein said interrupt generation circuit comprises a positive edge-triggered D type flip-flop for outputting said interrupt request signal when said positive edge-triggered D type flip-flop is set by said positive edge and reset by a respective one of said processors.

10. The apparatus of claim 6 further comprising an initialization prohibition means for prohibiting said logical one pulse to set said logical one to said flip-flop.

11. The apparatus of claim 10, wherein said initialization prohibition means comprising:
- a prohibition flag hold means being written a flag for prohibiting to initialize said prohibition flag hold means by a respective one of said processors; and
- an AND gate for inputting a logical AND between a value of said prohibition flag and said logical one pulse to said set terminal of said D flip-flop.

12. The apparatus of claim 1, wherein said flag has a value of one of a logical one and a logical zero, said logical one indicating an occurrence of an event in event synchronization and said logical zero indicating no event occurrence, and said control unit detects a change from said logical zero to said logical one, thereby outputting said logical one pulse.

13. The apparatus of claim 12, wherein said control unit comprising:
- an inverter for receiving a said synchronization signal from the lowermost stream synchronization unit and for outputting a logically reversed value, and
- a negative edge-triggered single shot circuit for outputting said logical one pulse when a negative edge is detected in a said synchronization signal sent from said lowermost-stream synchronization unit.

14. The apparatus of claim 12, wherein said control unit comprises a positive edge-triggered single shot circuit for outputting said logical one pulse when a positive edge is detected in a said synchronization signal sent from said lowermost-stream synchronization unit.

15. The apparatus of claim 13, wherein said logical OR means comprises an OR gate for receiving a said synchronization signal from an adjacent upstream synchronization unit and a value of said flag and for outputting a logical OR to an adjacent downstream synchronization unit as a said synchronization signal.

16. The apparatus of claim 15, wherein said flag hold means comprises a flip-flop for holding a value of said flag and for outputting said value to said OR gate.

17. The apparatus of claim 16, wherein said detection means comprises a positive edge triggered single shot circuit for outputting said pulse to said flip-flop when a positive edge is detected in a said logical OR outputted from said OR gate, and wherein said flip-flop comprises a set terminal for receiving an output of said positive edge triggered single shot circuit, said set terminal being set a logical one by said logical one pulse.

18. The apparatus of claim 17, wherein said output means comprises a tri-state buffer for receiving said logical OR from said logical OR means and for outputting an obtained value under a control of a read signal sent from a respective one of said processors.

19. The apparatus of claim 17, wherein said output means comprises an interrupt generation circuit for detecting said positive edge in the logical OR and for outputting a signal for requesting an interrupt to a respective one of said processors.

20. The apparatus of claim 19, wherein said interrupt generation circuit comprises a positive edge-triggered D type flip-flop for outputting said interrupt request signal when said positive edge-triggered D type flip-flop is set by said positive edge and reset by a respective one of said processors.

21. The apparatus of claim 17 further comprising an initialization prohibition means for prohibiting said logical one pulse to set said logical one to said flip-flop.

22. The apparatus of claim 21, wherein said initialization prohibition means comprises:
- a prohibition flag hold means for holding a prohibition flag for prohibiting initialization of said prohibition flag hold means by a respective one of said processors; and
- an AND gate for inputting a logical AND between a value of said prohibition flag and said logical one pulse to said set terminal of said D flip-flop.

23. The apparatus of claim 1 wherein said control unit comprises:
- an inverter for receiving a said synchronization signal from the lowermost stream synchronization unit and for outputting a logically reversed value;
- a switch for selecting one of a signal inputted to said inverter and a signal outputted from said inverter, thereby outputting a selected signal; and
- a negative edge-triggered single shot circuit for outputting said logical one pulse when a negative edge is detected in the selected signal outputted from said switch, wherein
- said switch selects said signal inputted to said inverter for a barrier synchronization and selects said signal outputted from said inverter for an event synchronization.

24. The apparatus of claim 1, wherein at least one of said synchronization units is a parallel synchronization unit, said parallel synchronization unit comprising:
- a plurality of synchronization flag hold units corresponding to said plurality of processors, respectively, each of said synchronization flag hold units holding a synchronization flag indicating a state of a respective one of said processors;
- a wired OR means for wired-ORing outputs of all the synchronization flag hold units;
- a logical OR means for ORing a said synchronization signal sent from an adjacent upstream synchronization unit with an output of said wired OR means and for outputting an obtained value to an adjacent downstream synchronization unit; and
- a plurality of synchronization detection units corresponding to said plurality of synchronization flag hold units, respectively, said synchronization detection units detecting said pulse in a said value outputted from said logical OR means, thereby initiating a respective one of said synchronization flag hold units.

25. The apparatus of claim 24, wherein said synchronization flag has a value of one of a logical one and a logical zero, said logical one indicating that a respective one of said processors is in operation and said logical zero indicating that a respective one of said processor is in a wait state, and said control means detects a change from said logical one to said logical zero, thereby outputting said pulse, said pulse being a logical one pulse with a fixed width.

26. The apparatus of claim 25, wherein said wired-OR means comprises:
- a plurality of open collector buffers corresponding to said plurality of synchronization flag hold units, respectively, each of said open collector buffers outputting a logical NOT of a respective one of said synchronization flag hold units;
- a wired-OR line for wired-ORing outputs of all the open collector buffers; and
- a NOT gate for outputting a logical NOT of an output of said wired-OR line to said logical OR means.

27. The apparatus of claim 26, wherein said logical OR means comprises an OR gate for receiving a said synchronization signal from an adjacent upstream synchronization unit and a value of said flag and for outputting a logical OR to an adjacent downstream synchronization unit as a said synchronization signal.

28. The apparatus of claim 27, wherein said synchronization flag hold means comprises a flip-flop for holding a value of said flag and for outputting said value to said OR gate.

29. The apparatus of claim 28, wherein said synchronization detection units comprises a positive edge triggered single shot circuit for outputting said pulse to said flip-flop when a positive edge is detected in a said logical OR outputted from said OR gate, and wherein said flip-flop comprises a set terminal for receiving an output of said positive edge triggered single shot circuit, said set terminal being set a logical one by said logical one pulse.

30. The apparatus of claim 29, wherein said parallel synchronization unit further comprises an output means for outputting a said synchronization signal sent from said logical OR means to at least one of said processors.

31. The apparatus of claim 30, wherein said output means comprises a tri-state buffer for receiving said logical OR from said logical OR means and for outputting an obtained value under a control of a read signal sent from a respective one of said processors.

32. The apparatus of claim 30, wherein said output means comprises an interrupt generation circuit for detecting said positive edge in the logical OR and for outputting a signal for requesting an interrupt to a respective one of said processors.

33. The apparatus of claim 32, wherein said interrupt generation circuit comprises a positive edge-triggered D type flip-flop for outputting said interrupt request signal when said positive edge-triggered D type flip-flop is set by said positive edge and reset by a respective one of said processors.

34. The apparatus of claim 24, wherein said flag has a value of one of a logical one and a logical zero, said logical one indicating an occurrence of an event in event synchronization and said logical zero indicating no event occurrence, and said control unit detects a change from said logical zero to said logical one, thereby outputting said logical one pulse.

35. The apparatus of claim 34, wherein said wired-OR means comprises:

a plurality Of open collector buffers corresponding to said plurality of synchronization flag hold units, respectively, each of said open collector buffers outputting a logical NOT of a respective one of said synchronization flag hold units;

a wired-OR line for wired-ORing outputs of all the open collector buffers; and a NOT gate for outputting a logical NOT of an output of said wired-OR line to said logical OR means.

36. The apparatus of claim 35, wherein said logical OR means comprises an OR gate for receiving a said synchronization signal from an adjacent upstream synchronization unit and a value of said flag and for outputting a logical OR to an adjacent downstream synchronization unit as a said synchronization signal.

37. The apparatus of claim 36, wherein said synchronization flag hold means comprises a flip-flop for holding a value of said flag and for outputting said value to said OR gate.

38. The apparatus of claim 37, wherein said synchronization detection units comprises a positive edge triggered single shot circuit for outputting said pulse to said flip-flop when a positive edge is detected in a said logical OR outputted from said OR gate, and wherein said flip-flop comprises a set terminal for receiving an output of said positive edge triggered single shot circuit, said set terminal being set a logical one by said logical one pulse.

39. The apparatus of claim 38, wherein said parallel synchronization unit further comprises an output means for outputting a said synchronization signal sent from said logical OR means to at least one, of said processors.

40. The apparatus of claim 39, wherein said output means comprises a tri-state buffer for receiving said logical OR from said logical OR means and for outputting an obtained value under a control of a read signal sent from a respective one of said processors.

41. The apparatus of claim 39, wherein said output means comprises an interrupt generation circuit for detecting said positive edge in the logical OR and for outputting a signal for requesting an interrupt to a respective one of said processors.

42. The apparatus of claim 41, wherein said interrupt generation circuit comprises a positive edge-triggered D type flip-flop for outputting said interrupt request signal when said positive edge-triggered D type flip-flop is set by said positive edge and reset by a respective one of said processors.

43. An apparatus for synchronizing parallel processing among a plurality of processors, comprising:

a control unit; and a plurality of synchronization units corresponding to the plurality of processors one to one, such that each processor has an associated synchronization unit, the control unit and the synchronization units being connected in a loop, wherein each of the synchronization units outputs a synchronization signal for notifying an adjacent downstream synchronization unit that said each synchronization unit has entered a wait state; and the control unit outputs a pulse for notifying an uppermost-stream synchronization unit that synchronization is complete among the processors, the pulse being forwarded as far as a lowermost-stream sychronization unit, wherein each of the synchronization units comprises:

a flag holding means for holding a flag indicating a state of an associated processor;

a logical OR means for ORing a synchronization signal sent from an adjacent upstream synchronization unit with a value of the flag and for outputting an obtained value to an adjacent downstream synchronization unit as a synchronization signal;

a detection means for detecting the pulse outputted by the control unit in the synchronization signal outputted from the logical OR means, thereby initializing the flag holding means; and an output means for outputting the value outputted from the logical OR means to the associated processor.

* * * * *